US012729738B2

(12) United States Patent
Nishizawa et al.

(10) Patent No.: US 12,729,738 B2
(45) Date of Patent: Sep. 8, 2026

(54) COIL SPRING

(71) Applicant: NHK SPRING CO., LTD., Yokohama (JP)

(72) Inventors: Shinichi Nishizawa, Walled Lake, MI (US); Daisuke Ibano, Yokohama (JP); Tsuyoshi Matsuda, Yokohama (JP); Norifumi Arisaka, Yokohama (JP); Shun Muramatsu, Yokohama (JP); Chihiro Ito, Yokohama (JP); Takuto Suzuki, Yokohama (JP); Masatake Kinoshita, Yokohama (JP); Asuka Kawasaki, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 235 days.

(21) Appl. No.: 18/076,717

(22) Filed: Dec. 7, 2022

(65) Prior Publication Data

US 2023/0304556 A1 Sep. 28, 2023

Related U.S. Application Data

(63) Continuation-in-part of application No. 17/703,295, filed on Mar. 24, 2022, now Pat. No. 11,940,031.

(51) Int. Cl.
*F16F 1/04* (2006.01)
*C09D 175/04* (2006.01)

(52) U.S. Cl.
CPC ............ *F16F 1/042* (2013.01); *C09D 175/04* (2013.01)

(58) Field of Classification Search
CPC ................ B60G 11/14; B60G 2202/12; B60G 2206/42; B60G 2600/44; B60G 2800/162;
(Continued)

(56) References Cited

U.S. PATENT DOCUMENTS 231,150 A 8/1880 Cliff
338,267 A * 3/1886 Hearle ...................... F16F 1/06 5/256

(Continued)

FOREIGN PATENT DOCUMENTS

CN 201382112 Y 1/2010
DE 2509934 A1 9/1976

(Continued)

OTHER PUBLICATIONS

International Search Report and Written Opinion dated Jan. 18, 2022, issued in International Application No. PCT/JP2021/040372.

(Continued)

*Primary Examiner* — Thomas W Irvin
(74) *Attorney, Agent, or Firm* — Holtz, Holtz & Volek PC

(57) ABSTRACT

A coil spring includes a wire rod and an elastic coat provided on the wire rod. The coil spring includes a coil section including a plurality of coil portions. The wire rod includes a round cross-sectional portion, a cross-section varying portion, and a rectangular cross-sectional portion along the longitudinal direction of the wire rod. The cross section of the rectangular cross-sectional portion is substantially square and has a first plane and a second plane. The first plane and the second plane oppose each other in the coil section. The elastic coat is provided on at least one of the first plane and the second plane. The elastic coat is continuous from the round cross-sectional portion to the cross-sectional variation portion and the rectangular cross-sectional portion.

12 Claims, 19 Drawing Sheets

(58) Field of Classification Search
CPC .... F16F 1/042; F16F 1/06; F16F 1/043; F16F 2230/00; F16F 2230/0023; F16F 2238/026; C09D 175/04
See application file for complete search history.

(56) References Cited

U.S. PATENT DOCUMENTS

| | | | | |
|---|---|---|---|---|
| 1,862,992 | A | 6/1932 | Vargha | |
| 1,963,054 | A | 6/1934 | Powers | |
| 2,230,069 | A | 1/1941 | Rushmore | |
| 2,267,153 | A * | 12/1941 | Holland | B61F 5/06 267/4 |
| 2,605,099 | A | 7/1952 | Brown | |
| 3,727,902 | A | 4/1973 | Burckhardt et al. | |
| 4,111,407 | A | 9/1978 | Stager | |
| 4,424,695 | A | 1/1984 | Kirchhoff et al. | |
| 4,753,423 | A | 6/1988 | Ukai et al. | |
| 4,763,882 | A | 8/1988 | Nishiyama et al. | |
| 4,869,471 | A | 9/1989 | Schwarz et al. | |
| 4,886,256 | A | 12/1989 | Nishiyama et al. | |
| 5,310,167 | A | 5/1994 | Noll | |
| 6,193,225 | B1 | 2/2001 | Watanabe | |
| 6,698,780 | B2 | 3/2004 | Miyoshi | |
| 9,463,676 | B2 | 10/2016 | Yamamotoya et al. | |
| 9,562,616 | B2 | 2/2017 | Strom et al. | |
| 10,065,471 | B2 | 9/2018 | Nishizawa | |
| 10,144,261 | B2 | 12/2018 | Nishizawa | |
| 10,155,425 | B2 | 12/2018 | Nishizawa | |
| 10,358,008 | B2 | 7/2019 | Yamamotoya et al. | |
| 11,807,058 | B2 | 11/2023 | Yamaguchi et al. | |
| 2003/0132561 | A1 * | 7/2003 | Burlage | F16F 1/44 267/179 |
| 2004/0075204 | A1 * | 4/2004 | Heidemann | F16F 1/376 267/294 |
| 2012/0019277 | A1 | 1/2012 | Kazama et al. | |
| 2020/0060513 | A1 | 2/2020 | Ito et al. | |
| 2020/0208702 | A1 | 7/2020 | Ono et al. | |
| 2022/0046205 | A1 | 2/2022 | Watanabe | |
| 2022/0178415 | A1 | 6/2022 | Nishizawa et al. | |
| 2023/0304558 | A1 * | 9/2023 | Nishizawa | F16F 1/024 |
| 2024/0271000 | A1 * | 8/2024 | Ibano | C09D 175/04 |

FOREIGN PATENT DOCUMENTS

| | | | |
|---|---|---|---|
| DE | 19619074 | A1 | 11/1997 |
| DE | 102014102061 | A1 | 8/2015 |
| JP | S151179 | Y1 | 2/1940 |
| JP | S51129554 | A | 11/1976 |
| JP | S52131556 | U | 10/1977 |
| JP | 54-052257 | * | 4/1979 |
| JP | S5452257 | A | 4/1979 |
| JP | S5534520 | U | 3/1980 |
| JP | S5637736 | U | 4/1981 |
| JP | S56141431 | A | 11/1981 |
| JP | S5711743 | A | 1/1982 |
| JP | S5740744 | U | 3/1982 |
| JP | S5855372 | A | 4/1983 |
| JP | S5855372 | B2 | 12/1983 |
| JP | S62155342 | A | 7/1987 |
| JP | H11159551 | A | 6/1999 |
| JP | 2000337415 | A | 12/2000 |
| JP | 2003206968 | A | 7/2003 |
| WO | 2022123960 | A1 | 6/2022 |
| WO | 2022260180 | A1 | 12/2022 |

OTHER PUBLICATIONS

Notice of Allowance dated Mar. 2, 2022, issued in U.S. Appl. No. 17/113,438.

Office Action (Non-Final Rejection) dated Oct. 8, 2021, issued in U.S. Appl. No. 17/113,438.

U.S. Appl. No. 17/113,438; First Named Inventor: Shinichi Nishizawa; Title: “Coil Spring”, filed Dec. 7, 2020.

U.S. Appl. No. 17/830,147; First Named Inventor: Shinichi Nishizawa; Title: “Coil Spring”, filed Jun. 1, 2022.

Related U.S. Appl. No. 18/494,235, First Named Inventor: Shinichi Nishizawa; Title: “Coil Spring and Suspension for Vehicle”, filed Oct. 25, 2023.

Related U.S. Appl. No. PCT/US2023/077735, First Named Inventor: Shinichi Nishizawa; Title: “Coil Spring and Suspension for Vehicle”; Filed: Oct. 25, 2023.

Related U.S. Appl. No. 18/321,447, First Named Inventor: Shinichi Nishizawa; Title: “Coil Spring”, filed May 22, 2023.

International Search Report (ISR) and Written Opinion dated Aug. 1, 2023, issued in International Application No. PCT/JP2023/020333.

International Search Report (ISR) and Written Opinion dated Apr. 4, 2023, issued in International Application No. PCT/JP2023/008340.

International Search Report (ISR) dated Jan. 25, 2024, issued in International Application No. PCT/US23/77735.

Written Opinion dated Jan. 25, 2024, issued in International Application No. PCT/US23/77735.

Office Action (Non-Final Rejection) dated Feb. 23, 2023, issued in related U.S. Appl. No. 17/703,295.

Extended European Search Report (EESR) dated Oct. 17, 2024, issued in European Application No. 21903064.0 (which is a counterpart of related U.S. Appl. No. 17/113,438).

Japanese Office Action (and an English language translation thereof) dated Feb. 4, 2025, issued in Japanese Application No. 2024-099969 (which is a counterpart of related U.S. Appl. No. 17/113,438).

Office Action (Non-Final Rejection) dated Aug. 22, 2025, issued in related U.S. Appl. No. 18/321,447.

Extended European Search Report (EESR) dated Jun. 23, 2025, issued in counterpart European Application No. 23774483.4.

Office Action (Non-Final Rejection) dated Feb. 18, 2026, issued in U.S. Appl. No. 18/494,235.

Office Action (Final Rejection) dated Mar. 12, 2026, issued in U.S. Appl. No. 18/321,447.

* cited by examiner

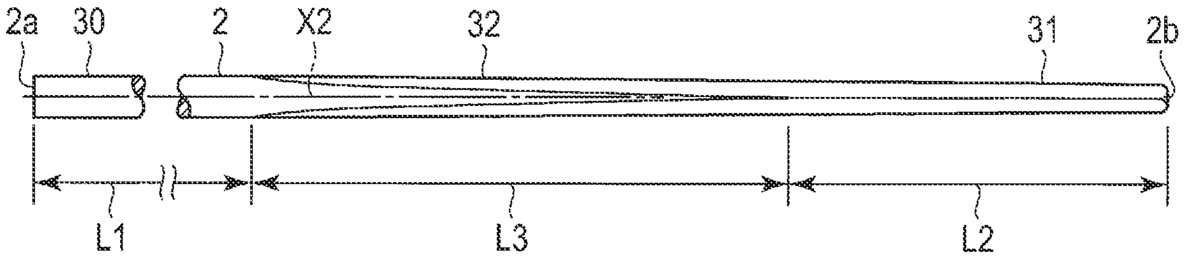
F I G. 3
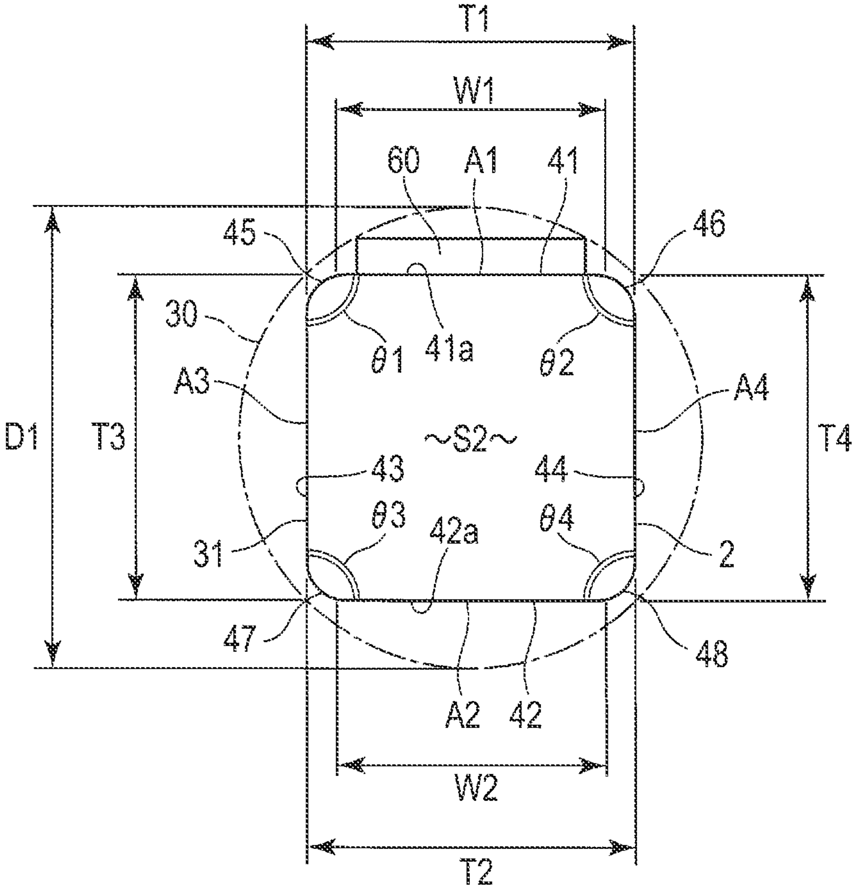
F I G. 4

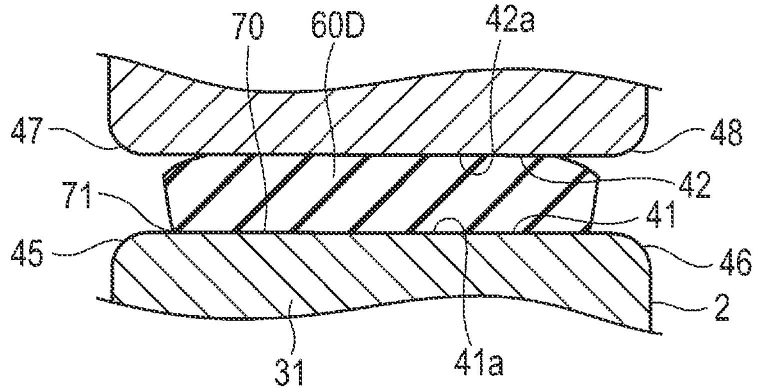
F I G. 6D
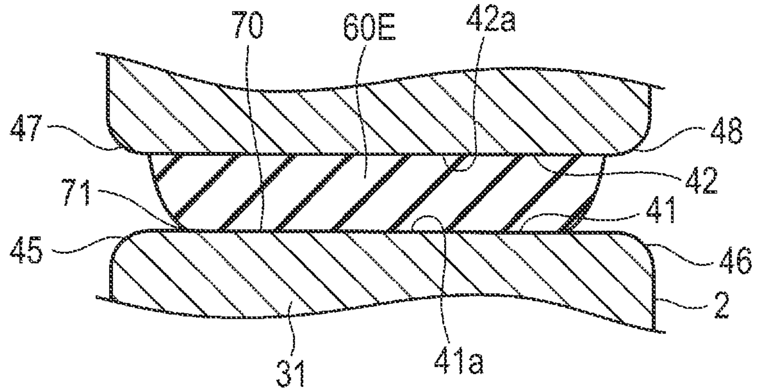
F I G. 6E
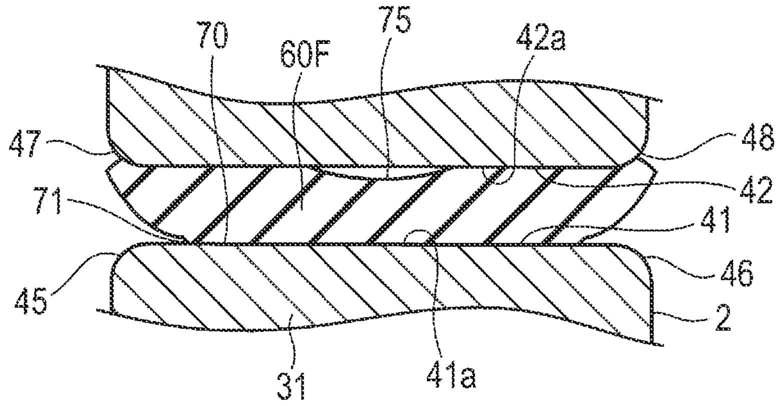
F I G. 6F

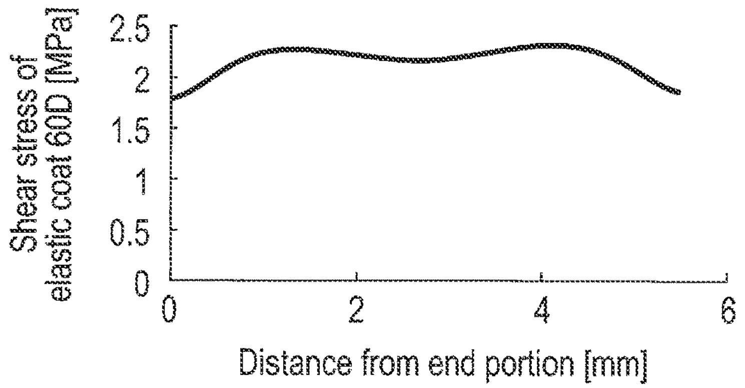
F I G. 7D
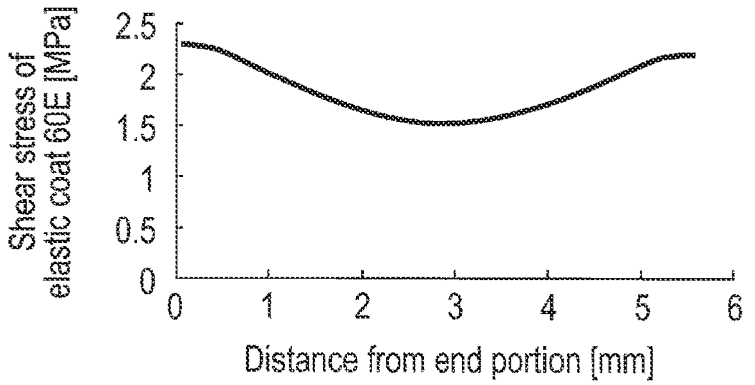
F I G. 7E
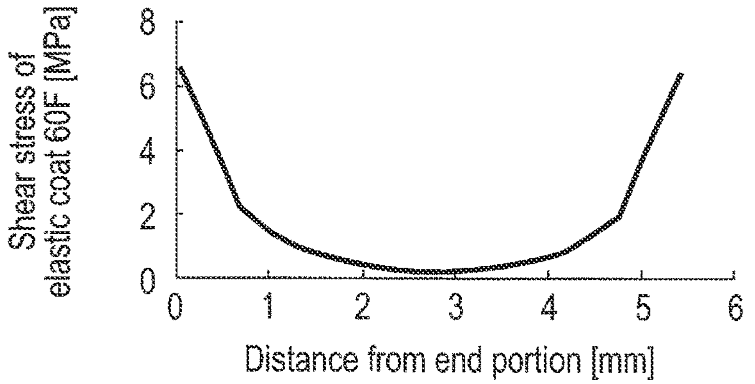
F I G. 7F

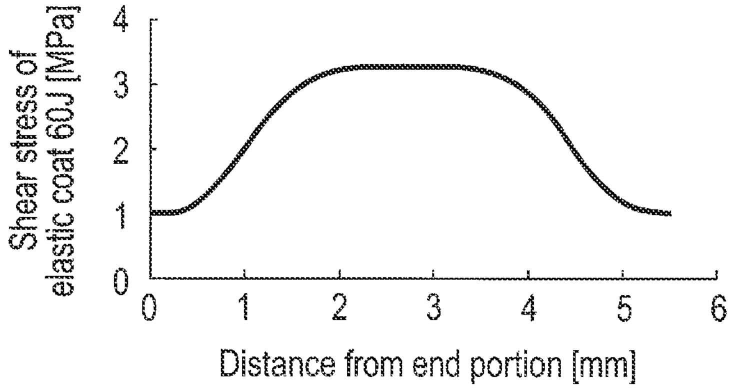
F I G. 7J
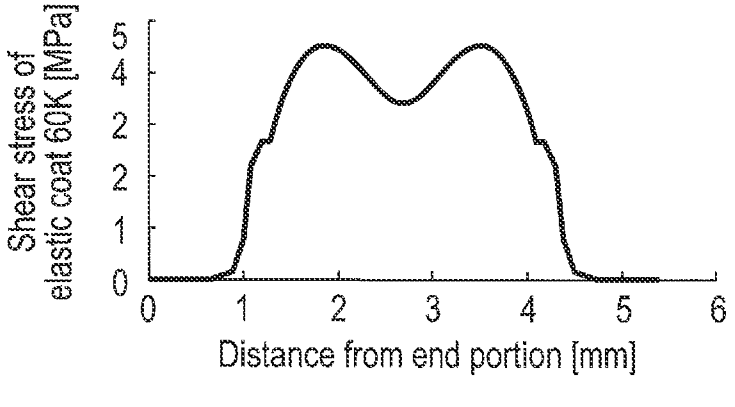
F I G. 7K

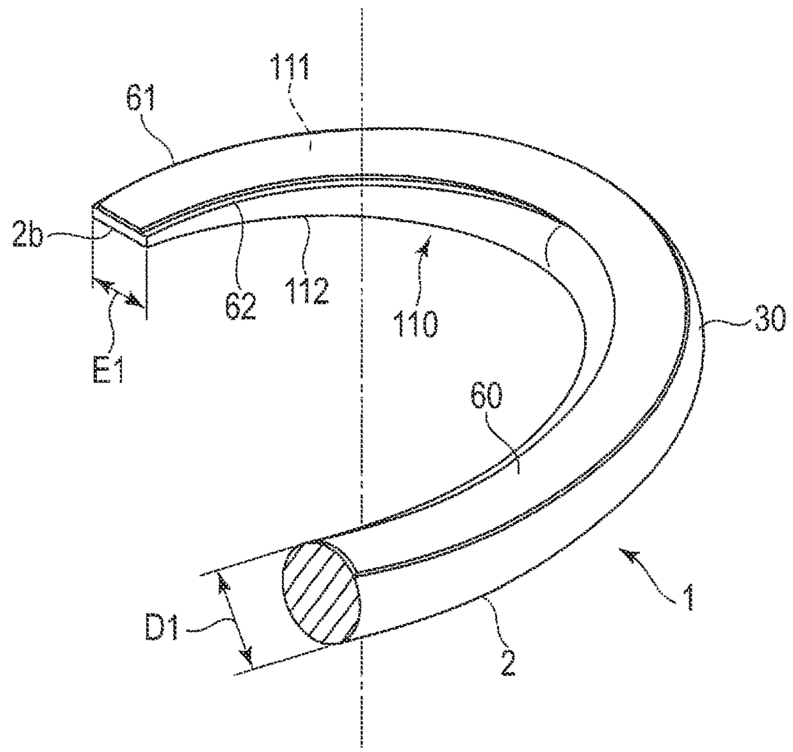
F I G. 8A
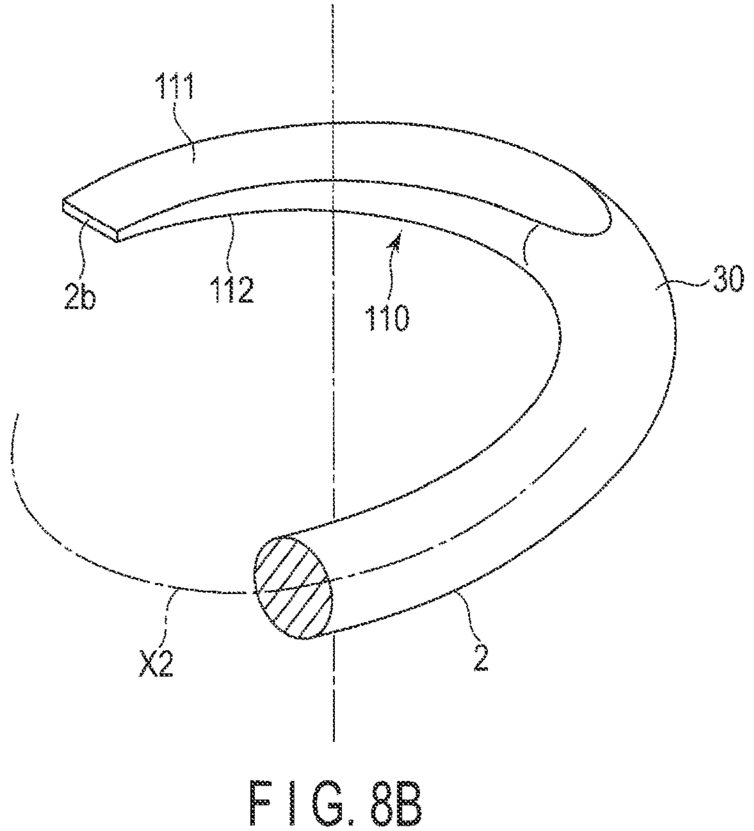
F I G. 8B

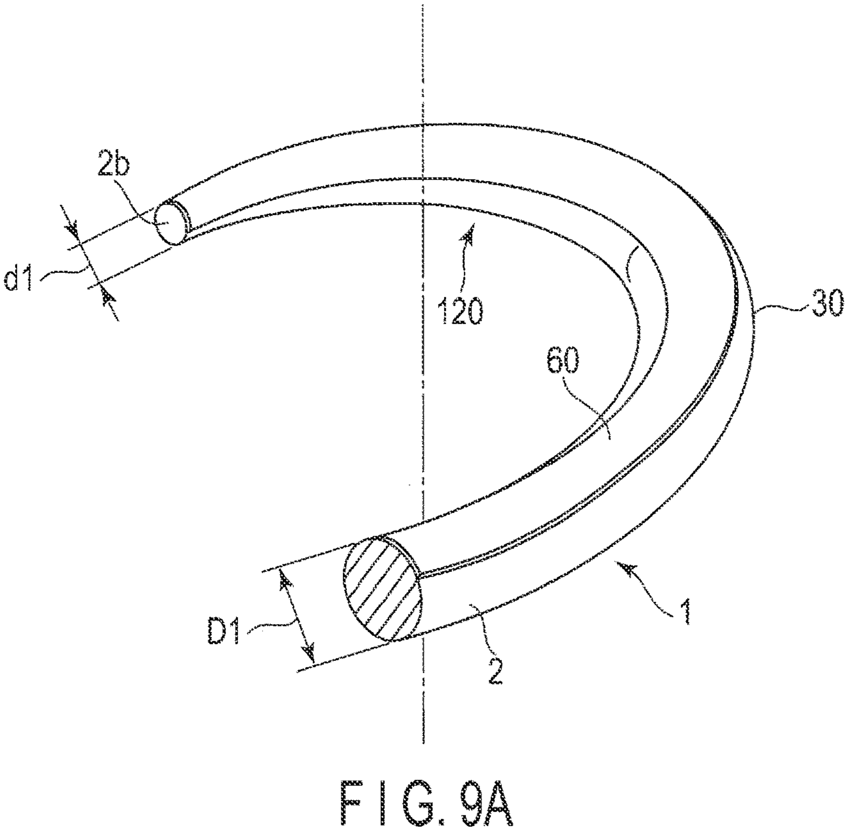
F I G. 9A
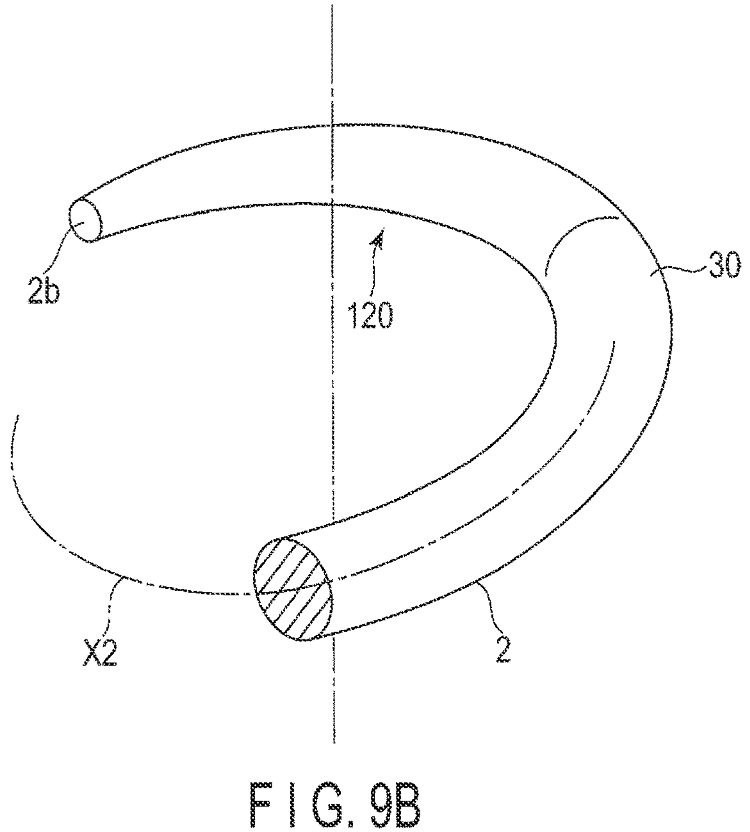
F I G. 9B

COIL SPRING

CROSS-REFERENCE TO RELATED APPLICATIONS

This application is a Continuation-in-Part Application of U.S. patent application Ser. No. 17/703,295, filed on Mar. 24, 2022, and issued as U.S. Pat. No. 11,940,031, on Mar. 26, 2024, the entire contents of which are incorporated herein by reference.

BACKGROUND OF THE INVENTION

1. Field of the Invention

The present invention relates to a coil spring having a plurality of coil portions formed into a spiral shape, and in particular to a suspension coil spring with an elastic coat on at least a part of the coil portions.

2. Description of the Related Art

Coil springs used in vehicle suspension devices include a helically-wound wire rod. In general, the cross-section of the wire rod (the cross-section perpendicular to the longitudinal direction of the wire rod) is round. The coil spring includes a first end turn part in contact with a first spring seat of the suspension device, a second end turn part in contacts with a second spring seat and an effective spring part between the first end turn part and the second end turn part. The effective spring part includes a plurality of coil portions, and depending on the magnitude of the load, some of the coil portions may be brought into contact with each other.

JP 558-55372 B2 (Patent Literature 1) discloses a coil spring which incudes a coating portion made of thermoplastic resin at sections where the coil portions of the effective spring part face each other. The coating portion is attached to the coil portions of the wire rod, which are round in cross section, to mitigate the sound (so-called striking sound) generated when the coil portions are brought into contact with each other. For this reason, the coating portion is conventionally provided only on the effective spring part of the wire rod, which has a round cross section. But, when the coating portion is applied on a wire rod with a round cross-section, stress concentrates on a part of the coating portion when the coil portions are brought into contact with each other due to the load of compression, which may affect the durability thereof.

Incidentally, for some specifications of the suspension device, a coil spring with nonlinear characteristics may be desired. An example of coil springs with nonlinear characteristics is disclosed in U.S. Pat. No. 4,111,407 A (Patent Literature 2). The coil spring of Patent Literature 2 includes a wire rod with a small cross sectional portion, in which the diameter of the wire rod decreases in a tapered manner from the middle of the effective spring part towards the tip of the wire rod. Moreover, JP 2000-337415 A (Patent Literature 3) discloses a coil spring which includes a flat-tapered small sectional portion in a part of the wire rod. In such a coil spring including a small sectional portion part in a part of the wire rod, when the small sectional portion is scratched, the scratch may lead to serious damage to the coil spring.

BRIEF SUMMARY OF THE INVENTION

An object of the present invention is to provide a coil spring that can suppress defects such as damage to wire rod, which may be caused as coil portions of the wire rod are brought into contact with each other and is suitable for particularly suspension springs for vehicles.

According to one embodiment of the present invention, there is provided a coil spring including a wire rod with one end and another end and including a coil section comprising a plurality of coil portions, which comprises a rectangular cross-sectional portion. The rectangular cross-sectional portion has a cross-section perpendicular to a longitudinal direction of the wire rod is rectangular, and includes a first plane and a second plane. The first plane and the second plane oppose each other in the coil section. Here, needless to say, squares are included in the rectangular. The squares are special cases of the rectangular where the four sides of the rectangular are all equal to each other. On at least one of the first plane and the second plane, an elastic coat provided. In this specification, the elastic coat may as be referred to as rubber for convenience.

An example of the elastic coat is made of a cured material of a resin having urethane bonds. Another example of the elastic coat is made of a composition containing a prepolymer in which a polyol and an isocyanate have reacted with each other. The tear strength of the elastic coat should preferably be 20 kN/m or more but 350 kN/m or less at 25° C. and 80° C. When the coil spring of this embodiment is used as a suspension spring for a vehicle, the shear stress of the elastic coat at 25° C. should be 6.0 MPa or less when the coil spring is compressed at maximum. The shear stress referred to here is the shear stress at the interface between the wire rod and the elastic coat. The compressive stress of the elastic coat should preferably be 20 MPa or less.

The coil spring of this embodiment can suppress damage to the wire rod due and banging noise, which may be caused as coil portions come into contact with each other. Moreover, the elastic coat of this embodiment is firmly secured to the wire rod to suppress defects such as peeling off of the elastic coat from the wire rod.

According to the coil spring of the embodiment, the wire rod may have a round cross-sectional portion and a cross section varying portion formed between the round cross-sectional portion and the rectangular cross-sectional portion. The elastic coat may be provided continuously from the round cross-sectional portion over to cross section varying portion and the rectangular cross-sectional portion along the longitudinal direction of the wire rod. For example, the elastic coat includes a first coat portion provided on the round cross-sectional portion, a second coat portion provided on the cross section varying portion, and a third coat portion provided on the rectangular cross-sectional portion.

The coil spring of the embodiment may comprise a first end turn part including the one end of the wire rod, a second end turn part including the other end of the wire rod and an effective spring part between the first end turn part and the second end turn part. One of the first end turn part and the second end turn part may include the rectangular cross-sectional portion, and the elastic coat may be provided on the rectangular cross-sectional portion.

The cross section varying portion may comprise a first plane portion continuous to the first plane of the rectangular cross-sectional portion, and the elastic coat may be provided continuously over the first plane and the first plane portion. The rectangular cross-sectional portion may include arc-shaped corner portions formed on respective sides of the first plane, and a width of the elastic coat may be less than or equal to a width of the first plane.

The elastic coat of the embodiment may be provided on a part of the plurality of coil portions. Further, the elastic coat may be provided only on those coil portions of the plurality of coil portions that may come into contact with each other when the coil spring is compressed. The elastic coat may comprise a plurality of elastic coat elements disposed to be spaced apart from each other along the longitudinal direction of the wire rod.

The elastic coat includes a first side portion facing an outside of the coil spring and a second side portion facing an inside of the coil spring. The first side portion of the elastic coat is located on an inner side of the coil spring with respect to an outermost surface of the wire rod, and the wire rod may include a rubber protective portion constituted by a part of the wire rod, between the first side portion and the outermost surface of the wire rod.

An end of the wire rod may include a flat taper portion including a first plane surface and a second plane surface. The distance between the first plane surface and the second plane surface decreases toward the end of the wire rod. The elastic coat may be provided on at least one of the first plane surface and the second plane surface. Further, an end of the wire rod includes a round taper portion in which a diameter of the wire rod decreases toward a tip end of the wire rod, and the elastic coat may be provided on the round taper portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a side view of a portion of the wire rod of the coil spring before being formed into a spiral shape.

FIG. 4 is a front view schematically showing an example of a rectangular cross-sectional portion and an example of an elastic coat.

FIG. 6D is a cross-sectional view respectively showing the elastic coat shown in FIG. 5D in a compressed state.

FIG. 6E is a cross-sectional view respectively showing the elastic coat shown in FIG. 5E in a compressed state.

FIG. 6F is a cross-sectional view respectively showing the elastic coat shown in FIG. 5F in a compressed state.

FIG. 7D is a view showing shear stress acting on an interface of the elastic coat when the elastic coat shown in FIG. 5D is in a compressed state.

FIG. 7E is a view showing shear stress acting on an interface of the elastic coat when the elastic coat shown in FIG. 5E is in a compressed state.

FIG. 7F is a view showing shear stress acting on an interface of the elastic coat when the elastic coat shown in FIG. 5F is in a compressed state.

FIG. 7J is a view showing shear stress acting on an interface of the elastic coat when the elastic coat shown in FIG. 5J is in a compressed state.

FIG. 7K is a view showing shear stress acting on an interface of the elastic coat when the elastic coat shown in FIG. 5K is in a compressed state.

FIG. 8A is a perspective view showing a part of a coil spring according to an Example 12.

FIG. 8H is a perspective view showing a part of a wire rod of the coil spring shown in FIG. 8A.

FIG. 9A is a perspective view showing a part of a coil spring according to an Example 13.

FIG. 9B is a perspective view showing a part of a wire rod of the coil spring shown in FIG. 9A.

DETAILED DESCRIPTION OF THE INVENTION

A coil spring according to one embodiment of the present invention will now be described with reference to FIGS. 1 to 4.

Figure 1:
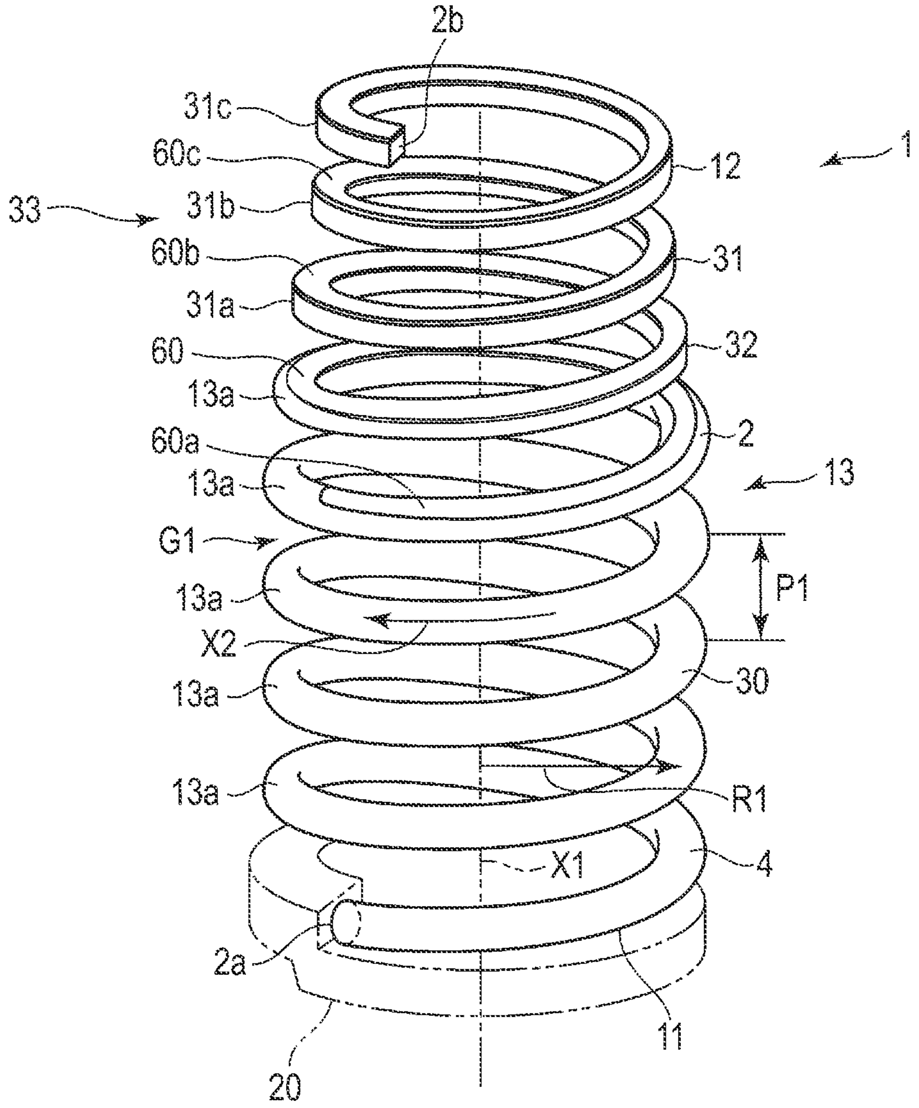
FIG. 1 is a perspective view of a coil spring according to one embodiment.
Figure 2A:
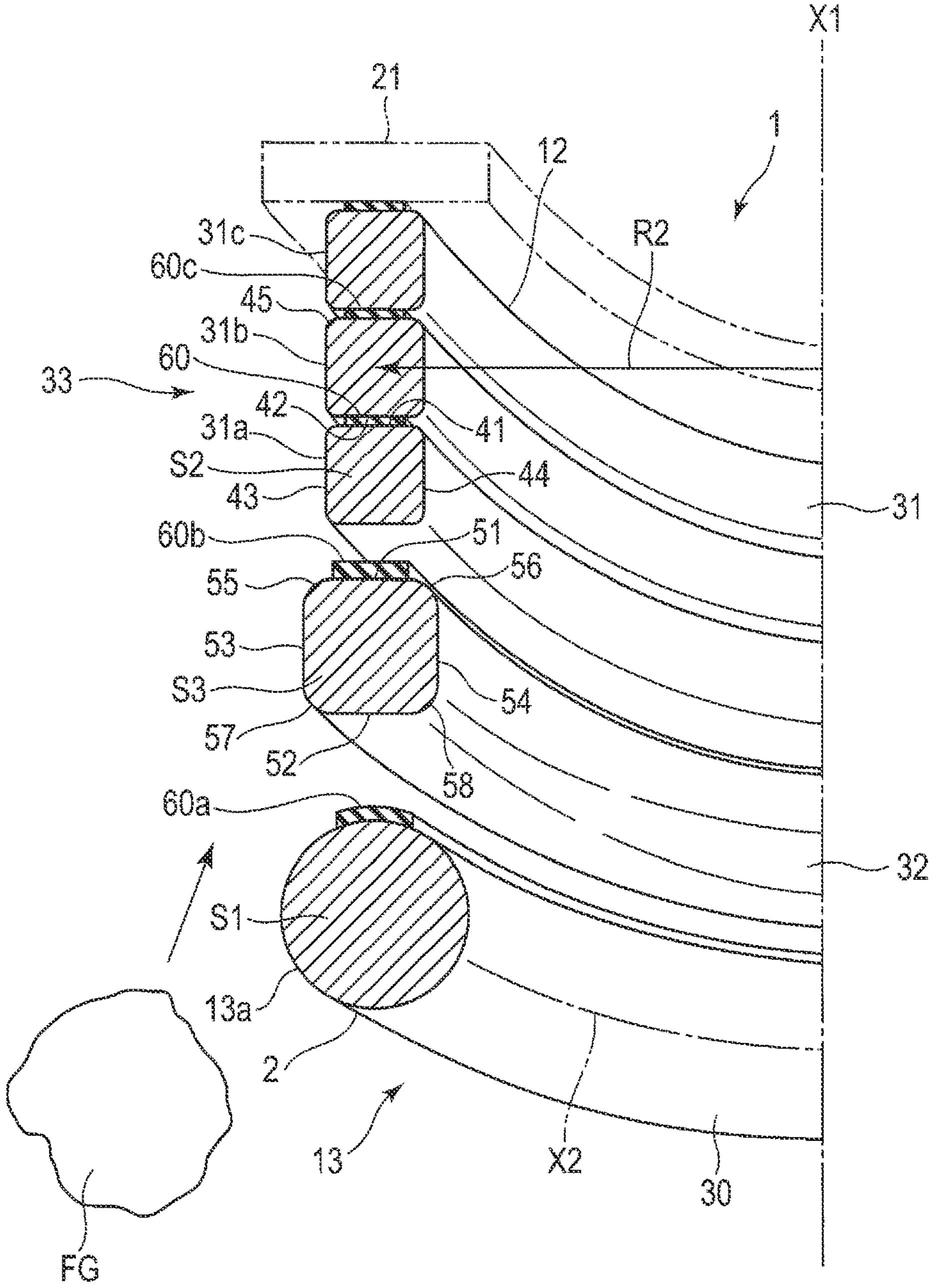
FIG. 2A is a perspective view of a part of the coil spring shown in FIG. 1, including cross sections of a wire rod thereof, in a compressed state.

FIG. 1 shows a coil spring 1 used in a suspension device of a vehicle such as an automobile. FIG. 2A is a perspective view of the coil spring 1 in a compressed state, including cross sections of portions of the spring. The coil spring 1 comprises a wire rod 2 formed into a spiral shape.

Figure 2B:
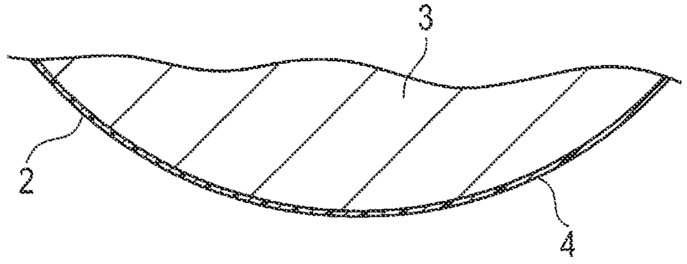
FIG. 2B is a cross section view of a part of the coil spring shown in FIG. 2A.

FIG. 2B is a partially enlarged cross-sectional view of the wire rod 2. As shown in FIG. 2B, the wire rod 2 includes a rod body 3 made of spring steel and a coating film 4 which covers an entire surface of the rod body 3. The coating film 4 is made of epoxy resin, for example, but may as well be of some other resin. The diameter of the rod body 3 may be arbitrary, but is, for example, 7 to 30 mm φ. The thickness of the coating film 4 is, for example, between 30 μm or more and 1000 μm or less. The coil spring 1 includes a first end turn part 11 including one end 2*a* of the wire rod 2, a second end turn part 12 including the other end 2*b* of the wire rod 2 and an effective spring part 13. The effective spring part 13 is formed between the first end turn part 11 and the second end turn part 12 and includes a plurality of coil portions 13*a*. When the coil spring 1 is assembled into the suspension device of a vehicle, the first end turn part 11 is located on the lower side and the second end turn part 12 is located on the upper side. The central axis X1 of the coil spring 1 extends in the vertical direction. The wire rod 2 has an axis X2 along the length direction of the wire rod 2.

The first end turn part 11 is supported by a spring seat 20 (shown in FIG. 1) provided in a lower part of the suspension device. The second end turn part 12 is supported by a spring sear 21 (shown in FIG. 2A) provided in an upper part of the suspension device. The coil spring 1 is compressed between the lower spring seat 20 and the upper spring seat 21. When the coil spring 1 is compressed in a predetermined load range (the range of load used as the suspension device), the effective spring part 13 has a gap G1 between coil portions 13*a* adjacent to each other. The coil spring 1 is used in the load range between the assumable minimum and maximum loads. The effective spring part 13 expands and contracts along the direction along the central axis X1 between a maximally compressed full bump state and a maximally extended full rebound state.

An example of the effective spring part 13 has a cylindrical shape in which a pitch P1 (shown in FIG. 1) is constant and a coil radius R1 is substantially constant. Here, the expression "substantially constant" indicates that the variation in the range of the tolerance of the coil spring manufactured by a coiling machine and the variation in the permissible range by springback are practically negligible. Note here that the coil spring may have a non-cylindrical shape in which the pitch P1 and the coil radius R1 vary in a direction along the central axis X1.

The wire rod 2 in this embodiment includes a round cross-sectional portion 30, a rectangular cross-sectional portion 31, and a cross-section varying portion 32. The first end turn part 11 and the effective spring part 13 each comprise a round cross-sectional portion 30. A section S1 (a cross section perpendicular to the axis X2 of the wire rod 2) of the round cross-sectional portion 30 is round. The section S1 of the round cross-sectional portion 30 is substantially constant along the length direction of the wire rod 2. The cross section varying portion 32 is formed between the round cross-sectional portion 30 and the rectangular cross-sectional portion 31. The cross section varying portion 32 varies from round to substantially rectangular in cross-section along the length direction of the wire rod 2.

Figure 2C:
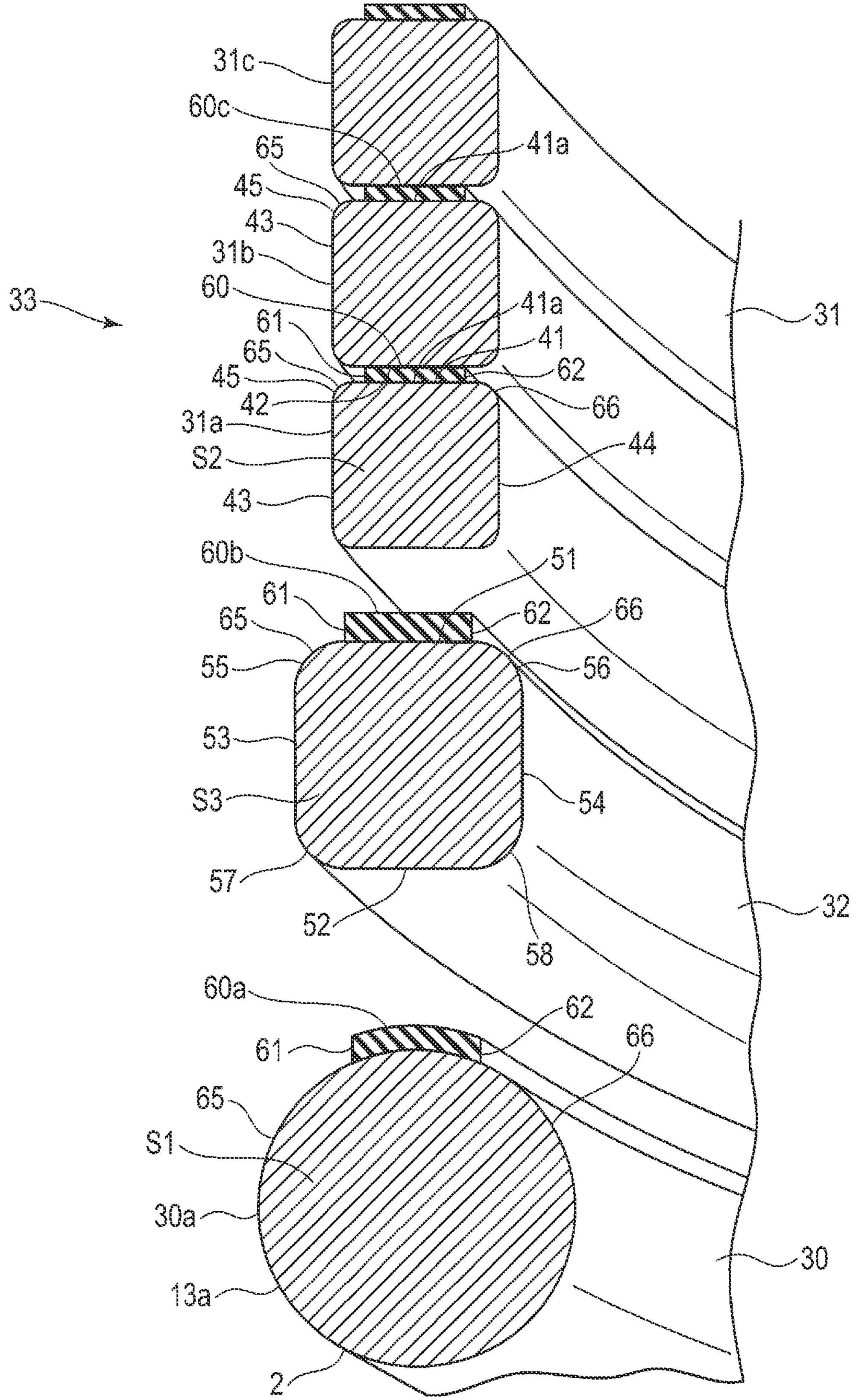
FIG. 2C is a perspective view of a part of the coil spring shown in FIG. 2A.

FIG. 2A is a perspective view showing a part of the coil spring 1 with cross sections of portions thereof (near the second end turn part 12) when compressed. FIG. 2C is an enlarged perspective view of a part of a cross section of the coil spring shown in FIG. 2A.

The second end turn part 12 comprises a rectangular cross-sectional portion 31. The rectangular cross-sectional portion 31 includes a coil section 33 comprising a plurality (two or more windings) of coil portions 31*a*, 31*b* and 31*c*. In this embodiment, as to a coil diameter R2 (shown in FIG. 2A) of the coil section 33, the coil portions 31*a*, 31*b* and 31*c* have diameters equivalent to each other. Note that in another embodiment, the coil portions 31*a*, 31*b* and 31*c* may have coil diameters different from each other.

The rectangular cross-sectional portion 31 has a first surface 41 located on an upper side in FIG. 2A, a second surface 42 on a lower side, a third surface 43 on an outer side and a fourth surface 44 on an inner side. The first surface 41 comprises a first plane 41*a* (shown in FIG. 4). The second surface 42 comprises a second plane 42*a* (shown in FIG. 4). The first plane 41*a* and the second plane 42*a* are, for example, parallel to each other. The term "parallel." here includes the meaning in the strict sense of geometry, but it also covers the concept of a parallel to the extent that variations in the tolerance range of the coil section 33 produced by the coiling machine and variations in the tolerance range due to springback are practically negligible.

The first plane 41*a* and the second plane 42*a* are approximately perpendicular to the central axis X1 of the coil spring 1 (shown in FIGS. 1 and 2A). In other words, the coil portions 31*a*, 31*b* and 31*c* of the rectangular cross-sectional portion 31 include the first surface 41 and the second surface 42 opposing each other in the coil section 33. The third surface 43 and the fourth surface 44 each extend in a direction along the central axes X1 of the coil spring 1.

FIG. 3 shows a part of the wire rod 2 before being coiled. An axis X2 passing through the center of the wire rod 2 extends along the length direction of the wire rod 2. The wire rod 2 shown in FIG. 3 includes a round cross-sectional portion 30 having a length L1, a rectangular cross-sectional portion 31 having a length L2, and a cross section varying portion 32 having a length L3. The round cross-sectional portion 30 has the length L1 which is required for a plurality of coil portions 13*a* of the effective spring part 13. The rectangular cross-sectional portion 31 is formed over the length L2 from an end 2*b* of the wire rod 2. The cross section varying portion 32 is formed over the length L3 between the round cross-sectional portion 30 and the rectangular cross-sectional portion 31.

FIG. 4 is a front view schematically showing an example of the rectangular cross-sectional portion 31. A section S2 (a cross-section perpendicular to the axis X2 of the wire rod 2) of the rectangular cross-sectional portion 31 is substantially square in shape. The term "substantially square" referred to in this specification includes a square in the strict sense of geometry, but it also covers such cases where lengths T1, T2, T3 and T4 of respective four sides A1, A2, A3 and A4 are equivalent to each other within the range of machining tolerances as of the section S2 schematically shown in FIG. 4. The length T1 of the first side A1 corresponds to a width of the first surface 41. The length T2 of the second side A2 corresponds to a width of the second surface 42. The length T3 of the third side A3 corresponds to a width of the third surface 43, and the length T4 of the fourth side A4 corresponds to a width of the fourth side 44.

The lengths T1, T2, T3 and T4 of the respective sides A1, A2, A3 and A4 are each a ½ of square root ($1/\sqrt{2}$) or less of the diameter D1 of the round cross-sectional portion 30. Internal angles θ1, θ2, θ3 and θ4 made by respective sides A1, A2, A3 and A4 with each other are substantially within the range of machining tolerances, and approximately 90°. At intersections of each adjacent pair of the sides A1, A2, A3 and A4, arc-shaped corner portions 45, 46, 47 and 48 are formed. The section S2 of the rectangular cross-sectional portion 31 is substantially constant along the length direction of the wire rod 2 (along the axis X2). The cross-sectional area of the rectangular cross-sectional portion 31 is smaller than that of the round cross-sectional portion 30. The corner portions 45, 46, 47 and 48 are each formed to have an arc-shaped cross section along the central axis X1 of the coil spring 1.

A section S3 (a cross-section perpendicular to the axis X2 of the wire rod 2) of the cross section varying portion 32 decreases its cross-sectional area as the shape gradually changes from round to substantial square from the round cross-sectional portion 30 to the rectangular cross-sectional area 31. The cross section varying portion 32 is located between the round cross-sectional portion 30 and the rectangular cross-sectional portion 31, to have a length L3 of 1.0 winding or more.

As shown in FIGS. 2A and 2C, the section S3 of the cross section varying portion 32 comprises a first plane portion 51, a second plane portion 52, a third plane portion 53, a fourth plane portion 54, a first arc portion 55, a second arc portion 56, a third arc portion 57 and a fourth arc portion 58. The first plane portion 51 is continuous to the first plane 41*a* of the rectangular cross-sectional portion 31. The second plane portion 52 is continuous to the second plane 42*a* of the rectangular cross-sectional portion 31. The third plane portion 53 is continuous to the third surface 43 of the rectangular cross-sectional portion 31. The fourth plane portion 54 is continuous to the fourth surface 44 of the rectangular cross-sectional portion 31. The third surface 43 and the third plane portion 53 are each located outside the coil spring 1. The fourth surface 44 and the fourth plane portion 54 are each located inside the coil spring 1.

The first arc portion 55 is continuous to the first corner portion 45 (shown in FIG. 4) of the rectangular cross-sectional portion 31. The second arc portion 56 is continuous to the second corner portion 46 of the rectangular cross-sectional portion 31. The third arc portion 57 is continuous to the third corner 47 of the rectangular cross-sectional portion 31. The fourth arc portion 58 is continuous to the fourth corner portion 48 of the rectangular cross-sectional portion 31.

The coil spring 1 of this embodiment includes an elastic coat 60. In this specification, the elastic coat may as be referred to as rubber for convenience. The elastic coat 60 is formed from a longitudinal middle (the round cross-sectional portion 30) of the effective spring part 13 of the coil spring 1 to the end 2*b* of the wire rod 2 over the cross section varying portion 32 and the rectangular cross-sectional portion 31. When the central axis X1 of the coil spring 1 extends in the vertical direction as shown in FIG. 1, the elastic coat 60 is provided on at least one of upper and lower surfaces of the wire rod 2. The coil spring 1 shown in FIG. 1, for example, the elastic coat 60 is provided on the upper surface of the wire rod 2 (the first surface 41 and the like). Note that the elastic coat 60 may be provided on the lower surface of the wire rod 2 (the second surface 42 and the like), or on both the upper and lower surfaces of the wire rod 2. The elastic coat 60 includes a first side portion 61 facing the outside of the coil spring 1 and a second side portion 62 facing the inside of the coil spring 1.

In the coil spring 1 of this embodiment, the elastic coat 60 is provided on some of the coil portions 13*a*, 31*a*, 31*b* and 31*c*. The elastic coat 60 may as well be provided on only those of the coil portions 13*a*, 31*a*, 31*b* and 31*c*, which may possibly come in contact with each other when the coil spring 1 is compressed.

The elastic coat 60 of this embodiment includes a first coat portion 60*a* provided on the round cross-sectional portion 30, a second coat portion 60*b* provided on the cross section varying portion 32, and a third coat portion 60*c* provided on the rectangular cross sectional portion 31. The first coat portion 60*a* is provided on the upper surface of the round cross-sectional portion 30 in FIG. 2. The second coat portion 60*b* is provided on the upper surface of the cross section varying portion 32 (the first plane portion 51). The third covered portion 60*c* is provided on the upper surface of the rectangular cross-sectional portion 31 (the first plane 41*a*). The first coat portion 60*a*, the second coat portion 60*b* and the third coating portion 60*c* are formed to be continuous into one body along the length direction of the wire rod 2.

When a vehicle travels on a road surface, stones, sand, metal pieces and the like on the road surface may be blown off the road surface by the tires. For example, as shown in FIG. 2A, a flying gravel FG from the road surface may be headed toward the coil spring 1. It the flying gravel FG touches the side portion 61 of the elastic coat 60, the side portion 61 may peel off from the wire rod, or the side portion 61 may be damaged. Such damaged parts may become a starting point for further damage to the elastic coat 60.

Under these circumstances, the coil spring 1 of this embodiment is provided with a rubber protective portion 65 at a site where the elastic coat 60 is formed in the length direction of the wire rod 2 (along the axis X2). As described below, the rubber protective portion 65 is constituted by a part of the wire rod 2 and is defined between the first side portion 61 of the elastic coat 60 and the outermost surface of the wire rod 2.

As shown in FIGS. 2A and 2C, in the cross section of the coil spring 1 taken along the central axis X1 (see FIG. 2A), the first side portion 61 of the elastic coat 60 is located on an inner side by a small distance (for example, about 1 to 5 mm) with respect to from the outermost surface of the wire rod 2. The term "outermost surface" used here means, in the round cross-sectional portion 30, the outer circumferential portion 30*a* of the coil spring 1 of the circumferential surface of the wire rod 2.

The outermost surface of the rectangular cross-sectional portion 31 is the third surface 43. As shown in FIG. 2C, the rubber protective portion 65 of the rectangular cross-sectional portion 31 includes a corner portion 45 between the first plane surface 41*a* and the third surface 43. The outermost surface of the cross section varying portion 32 is the third plane portion 53. The rubber protective portion 65 of the cross section varying portion 32 includes a first arc portion 55 between the first plane portion 51 and the third plan portion 53.

The second side portion 62 of the elastic coat 60 faces the inside of the coil spring 1. Between the second side portion 62 and the innermost surface of the wire rod 2, a rubber protective portion 66, which is similar to the rubber protective portion 65, may be provided. The term "innermost surface" used here means, in the round cross-sectional portion 30, the inner circumference of the coil spring 1 of the circumferential surface of the wire rod 2. The innermost surface of the rectangular cross-sectional portion 31 is the fourth surface 44. The innermost surface of the cross section varying portion 32 is the fourth plane portion 54.

The coil spring 1 of this embodiment includes the rubber protective portion 65, which can prevent a flying gravel FG from the road surface from touching the elastic coat 60. The coil springs of Examples 1 to 13 (FIGS. 5A to 5K, FIGS. 6A to 6K, FIGS. 8A and 8B), which will be described later, as well should preferably include a rubber protection section 65.

FIG. 2A shows the coil spring 1 in a state of being compressed by a load applied in the direction along the central axis X1. When the coil spring 1 is compressed, the coil portions 31*a*, 31*b* and 31*c* are stacked on each other via the elastic coat 60. More specifically, in the coil section 33, each adjacent pair of coil portions 31*a*, 31*b* and 31*c* are stacked on each other with the elastic coat 60 interposed therebetween. With this structure, the elastic coat 60 is compressed between the first pane 41*a* and the second plane 42*a*, and therefore the thickness of the elastic coat 60 decreases. When the load of compression is removed, the elastic coat 60 restores substantially the original shape and thickness due to the elastic restoring force.

As shown in FIG. 4, the lengths T1, T2, T3 and T4 of the sides A1, A2, A3 and A4 of the rectangular cross-sectional portion 31 each are one half of the square root ($1/\sqrt{2}$) of the diameter D1 of the round cross-sectional portion 30. The cross-sectional area of the rectangular cross-sectional portion 31 is smaller than that of the round cross-sectional portion 30. The polar moment of inertia of area of the rectangular cross-sectional portion 31 is smaller than the polar moment of inertia of area of the round cross-sectional portion 30. The polar moment of inertia of area of the cross section varying portion 32 is larger than the polar moment of inertia of area of the rectangular cross-sectional portion 31, but smaller than the polar moment of inertia of area of the round cross-sectional portion 30.

When the coil spring 1 is compressed by the load in the direction along the central axis X1 and the load is small, the coil portions 31*a*, 31*b* and 31*c* of the rectangular cross-sectional portion 31 are brought into tight contact with each other. As the load increases, the coil portions of the cross section varying portion 32 as well are brought into tight contact with each other. When the load reaches the maximum, the coil portion 33*a* of the effective spring part 13 of the round cross-sectional portion 30 may be brought into contact therewith. Thus, the coil spring 1 of this embodiment has nonlinear characteristics in which the spring constant increases as the load increases.

One example of the elastic coat 60 is made of a cured material of a composition of a resin having urethane bonds (for example, urethane resin). As needed, an additive such as a thickener is blended to the composition. The aforementioned composition is applied to the surface of the wire rod 2 from a nozzle of a coating device to have a predetermined thickness. The coil spring coated with the composition is heated by a furnace or the like to cure the composition. As the composition is cured, the elastic coat 60 is formed on the surface of the wire rod 2. The elastic coat 60 is secured to the surface of the wire rod 2 by the adhesive force of its own.

An example of the material for the elastic coat 60 is a composition containing a polymer polyol, an isocyanate and a chain lengthener. Examples of the polymer polyol include polycarbonate-type polyols, polyether polyols having a bisphenol structure, lactone polyols, polyester polyols and the like. Examples of the chain lengthener include ethylene glycol, 1,4-butanediol, 1,6-hexanediol, trimethylolpropane, glycerin and the like. In short, the chain lengtheners are bifunctional to tetrafunctional polyols with molecular weights of 60 to 300 and the like. Another example of the material for the elastic coat 60 is a composition containing a prepolymer in which a polyol reacts with an isocyanate. Examples of the polyol include polymeric polyols as described above or a low molecular weight polyol listed in the examples of the chain lengthener.

When assuming that the coil spring 1 is used in a suspension spring tor a vehicle, the tear strength of the elastic coat 60 at each of room temperature (25° C.) and high temperature (80° C.) should preferably be 20 kN/m or higher from the point of view of durability. In consideration of the durability at room temperature, the tear strength of the elastic coat 60 should preferably be 60 kN/m or higher. In consideration of the shock absorbing property of the elastic coat 60, the upper limit of the tear strength at each of room temperature (25° C.) and high temperature (80° C.) should preferably be 350 kN/m or less.

The tearing strength here was measured by a tear test based on the Japanese Industrial Standard JISK7311. In the tear test, a sample of a predetermined shape (right-angled tear test sample) was attached to a tensile testing machine with a gripping width of 25 mm and a gripping distance of 40 mm. The sample was stretched at a tensile speed of 300 mm/min and a maximum load F3 (N) at which the sample was torn was measured. The tensile strength (kN/m) was calculated based on the measured maximum load F3 (N) and the formula (1) provided below.

$$\text{Tensile strength (kN/m)} = F3/(\text{thickness of sample (m)}) \quad (1)$$

Examples 1 to 11

Eleven types of coil springs comprising elastic coats 60A to 60K according to Examples 1 to 11, respectively, will now be described. The materials for the elastic coats 60A to 60K are the same as that of the elastic coat 60 (the resin composition) described in the embodiment previously described.

The coil spring of Example 1 (FIG. 5A) should preferably have rubber protective portions 65 and 66 to protect the elastic coat 60A from foreign matters such as a flying gravel and the like. The coil springs shown in FIGS. SB to 6K, 8A and 8B should preferably include similar rubber protective portions 65 and 66.

FIGS. 5A to 5K show elastic coats 60A to 6K having cross sections different from each other in an uncompressed state. The width T1 of the first surface 41 of the rectangular cross-sectional portion 31 (shown in FIG. 4) and the width T2 of the second surface 42 are both 7 mm. The radius of curvature of the corner portions 45 and 46 is 0.8 mm at maximum.

As shown in FIG. 4, the first surface 41 includes a first plane 41*a* formed between the corner portions 45 and 46. The second plane 42 includes a second plane 42*a* formed between the corner portions 47 and 48. The width W1 of the first plane 41*a* and the width W2 of the second plane 42*a* are both 5.4 mm. The widths Y1 of the elastic coats 60A to 60K shown in FIGS. 5A to 5K are all 5.4 mm. The widths Y1 of the elastic coats 60A to 60K should preferably be less than or equal to the width W1 of the first plane 41*a*. But, a part of the elastic coats 60A to 60K may be attached to the corner portions 45 and 46.

FIGS. 6A to 6K are cross-sectional views respectively showing the elastic coats 60A to 60K shown in FIGS. SA to 5K in a compressed state. The load of compression is 60 N. FIGS. 7A through 7K respectively show the shear stress acting on the interface 70 between each respective one of the elastic coats 60A to 60K and the respective wire rod 2 when the elastic coats 60A to 60K are in a compressed state.

Example 1

Figure 5A:
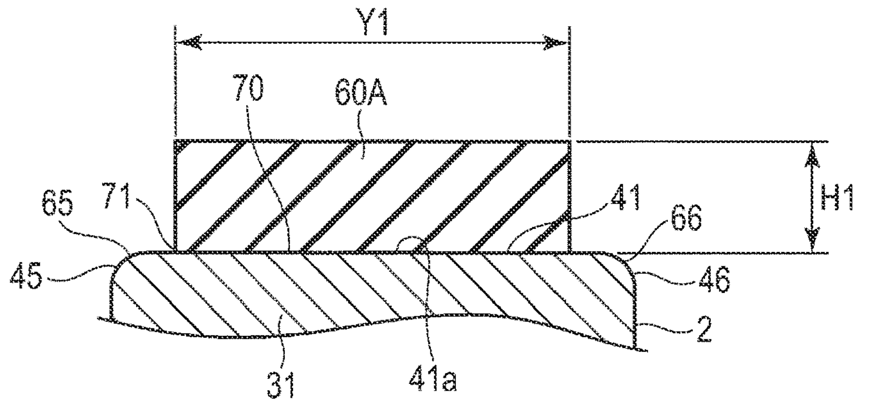
FIG. 5A is a cross-sectional view showing a part of an elastic coat and a rectangular cross-sectional portion of an Example 1.
Figure 6A:
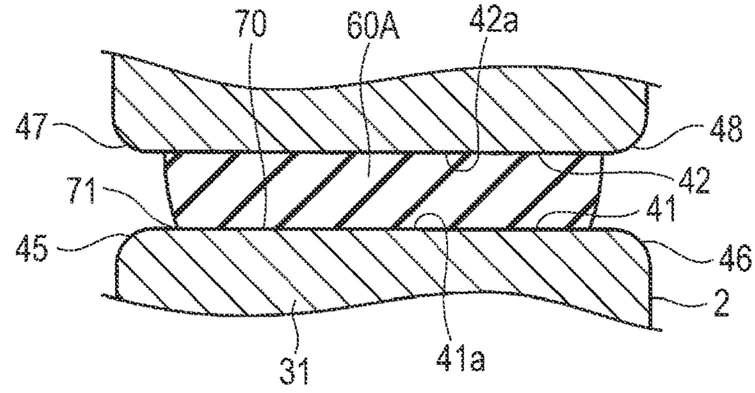
FIG. 6A is a cross-sectional view respectively showing the elastic coat shown in FIG. 5A in a compressed state.
Figure 7A:
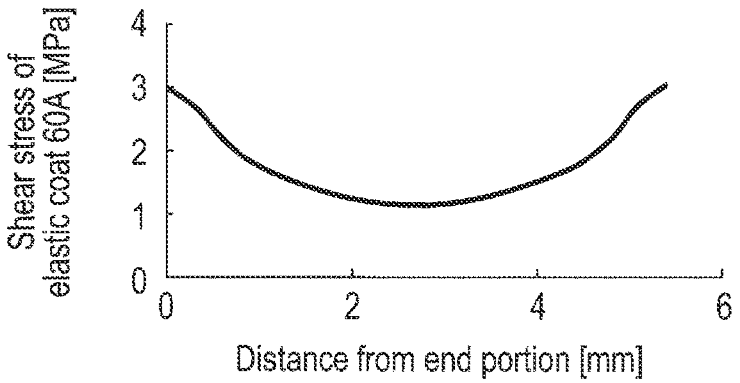
FIG. 7A is a view showing shear stress acting on an interface of the elastic coat when the elastic coat shown in FIG. 5A is in a compressed state.

FIG. 5A shows the elastic coat 60A of Example 1. The cross-section of the elastic coat 60A was a horizontal rectangle, and a thickness (height) H1 was 1.5 mm. FIG. 6A shows the state where the elastic coat 60A was compressed between the first plane 41*a* and the second plane 42*a*. When the elastic coat 60A was compressed, shear stress was created at the interface 70 between the first plane 41*a* and the elastic coat 60A. The maximum value of the shear stress was 3.09 MPa and the maximum value of the compressive stress was 8.12 MPa. FIG. 7A shows the relationship between the distance from the end 71 of the elastic coat 60A and the shear stress.

Example 2

Figure 5B:
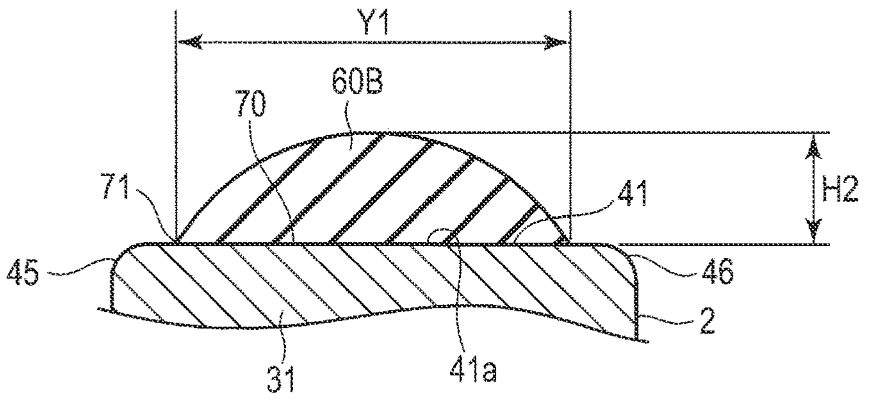
FIG. 5B is a cross-sectional view showing a part of an elastic coat and a rectangular cross-sectional portion of an Example 2.
Figure 6B:
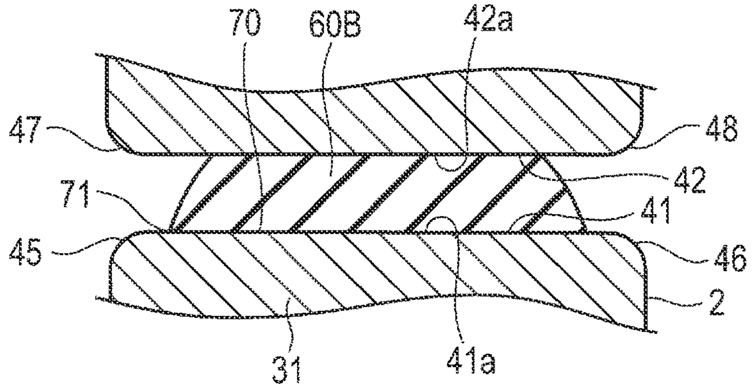
FIG. 6B is a cross-sectional view respectively showing the elastic coat shown in FIG. 5B in a compressed state.
Figure 7B:
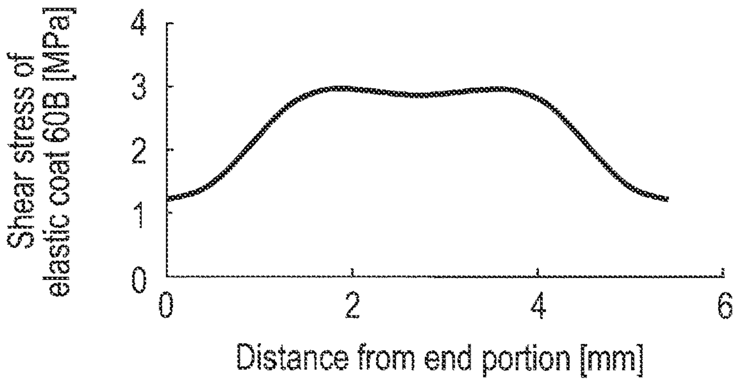
FIG. 7B is a view showing shear stress acting on an interface of the elastic coat when the elastic coat shown in FIG. 5B is in a compressed state.

FIG. 5B shows the elastic coat 60B of Example 2. The cross-section of the elastic coat 60B was a convex upward, and a height H2 at the center was 1.5 mm. As shown in FIG. 6B, when the elastic coat 60B was compressed, the maximum value of the shear stress at the interface 70 was 3.05 MPa and the maximum value of the compressive stress was 12.63 MPa. FIG. 7B shows the relationship between the distance from the end 71 of the elastic coat 60B and the shear stress.

Example 3

Figure 5C:
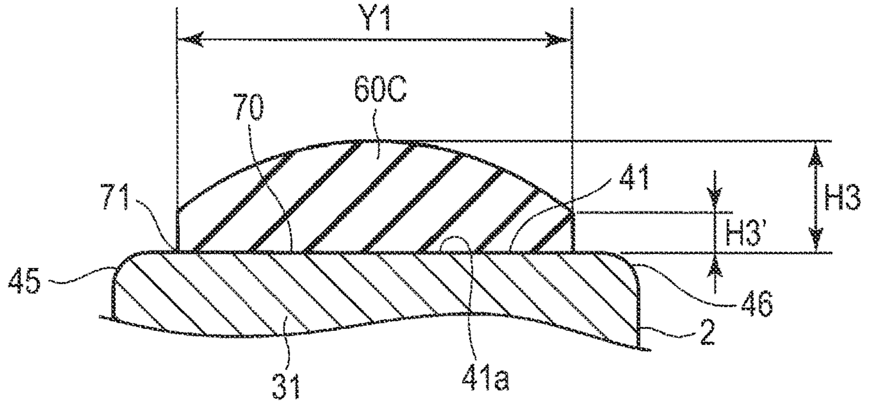
FIG. 5C is a cross-sectional view showing a part of an elastic coat and a rectangular cross-sectional portion of an Example 3.
Figure 6C:
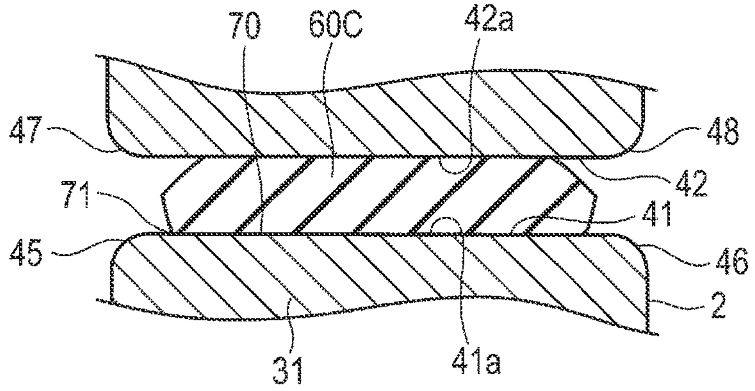
FIG. 6C is a cross-sectional view respectively showing the elastic coat shown in FIG. 5C in a compressed state.
Figure 7C:
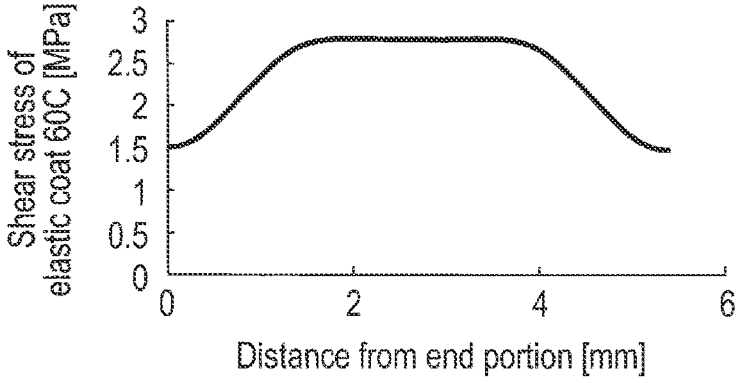
FIG. 7C is a view showing shear stress acting on an interface of the elastic coat when the elastic coat shown in FIG. 5C is in a compressed state.

FIG. 5C shows the elastic coat 60C of Example 3. The cross-section of the elastic coat 60C was a slightly flattened convex upward, and a height H3 at the center was 1.5 mm and the height H3' at both ends was 0.5 mm. As shown in FIG. 6C, when the elastic coat 60C was compressed, the maximum value of the shear stress at the interface 70 was 2.78 MPa and the maximum value of the compressive stress was 11.42 MPa. FIG. 7C shows the relationship between the distance from the end 71 of the elastic coat 60C and the shear stress.

Example 4

Figure 5D:
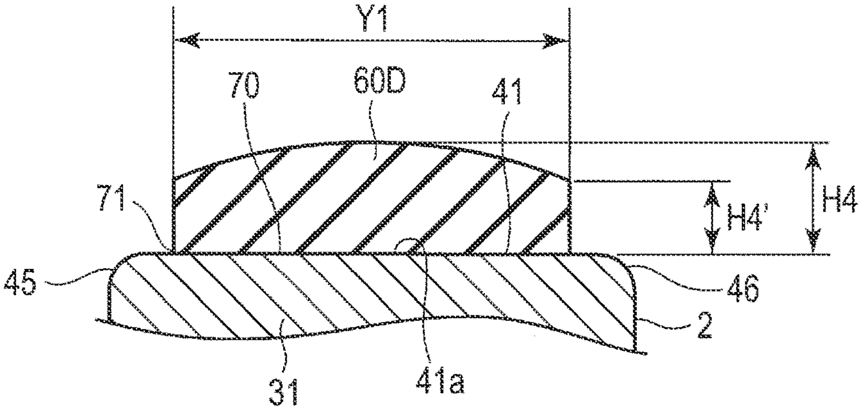
FIG. 5D is a cross-sectional view showing a part of an elastic coat and a rectangular cross-sectional portion of an Example 4.

FIG. 5D shows the elastic coat 60D of Example 4. The cross-section of the elastic coat 60D was a flattened convex upward, and a height H4 at the center was 1.5 mm and the height H4' at both ends was 1.0 mm. As shown in FIG. 6D, when the elastic coat 60D was compressed, the maximum value of the shear stress at the interface 70 was 2.28 MPa and the maximum value of the compressive stress was 9.36 MPa. FIG. 70 shows the relationship between the distance from the end 71 of the elastic coat 60D and the shear stress.

Example 5

Figure 5E:
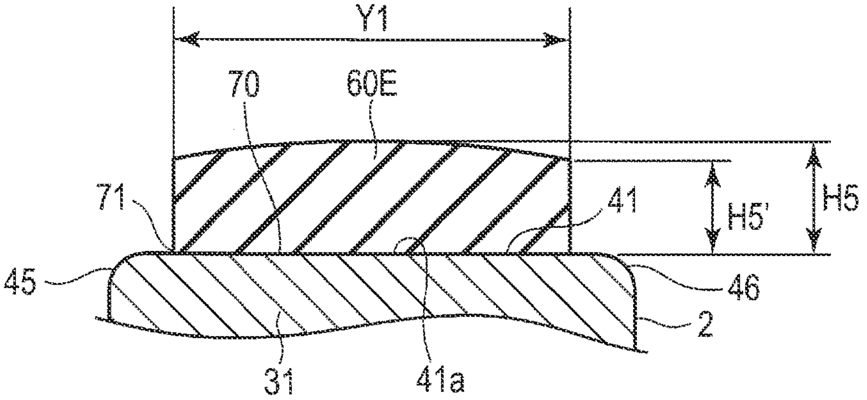
FIG. 5E is a cross-sectional view showing a part of an elastic coat and a rectangular cross-sectional portion of an Example 5.

FIG. 5E shows the elastic coat 60E of Example 5. The cross-section of the elastic coat 60E was a substantially flattened convex, and d height H5 at the center was 1.5 mm and a height H5' at both ends was 1.3 mm. As shown in FIG. 6E, when the elastic coat 60E was compressed, the maximum value of the shear stress at the interface 70 was 2.35 MPa and the maximum value of the compressive stress was 7.39 MPa. FIG. 7E shows the relationship between the distance from the end 71 of the elastic coat 60E and the shear stress.

Example 6

Figure 5F:
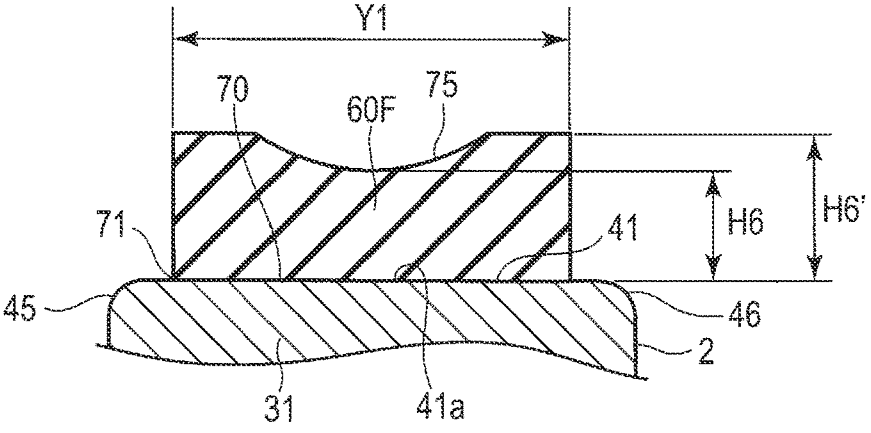
FIG. 5F is a cross-sectional view showing a part of an elastic coat and a rectangular cross-sectional portion of an Example 6.

FIG. 5F shows the elastic coat 60F of Example 6. The elastic coat 60F had an arc-shaped concave portion 75 having a curvature radius of 3.63 mm. A height H6 at the center of the concave portion 75 was 1.5 mm and a height H6' at both ends was 2.0 mm. As shown in FIG. 6F, when the elastic coat 60F was compressed, the maximum value of the shear stress at the interface 70 was 6.83 MPa and the maximum value of the compressive stress was 20.56 MPa. FIG. 7F shows the relationship between the distance from the end 71 of the elastic coat 60F and the shear stress.

Example 7

Figure 5G:
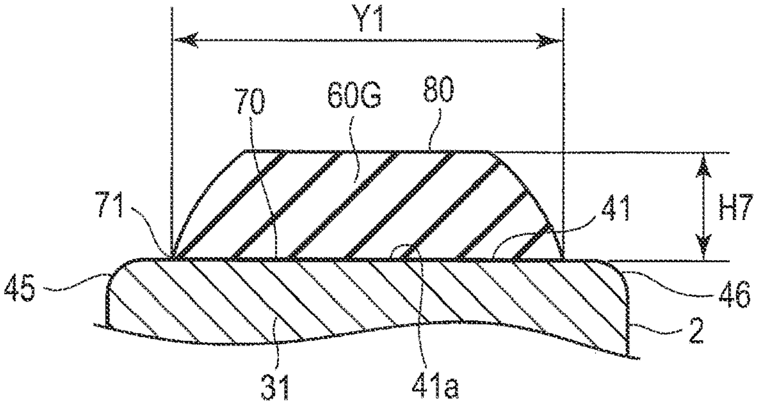
FIG. 5G is a cross-sectional view showing a part of an elastic coat and a rectangular cross-sectional portion of an Example 7.
Figure 6G:
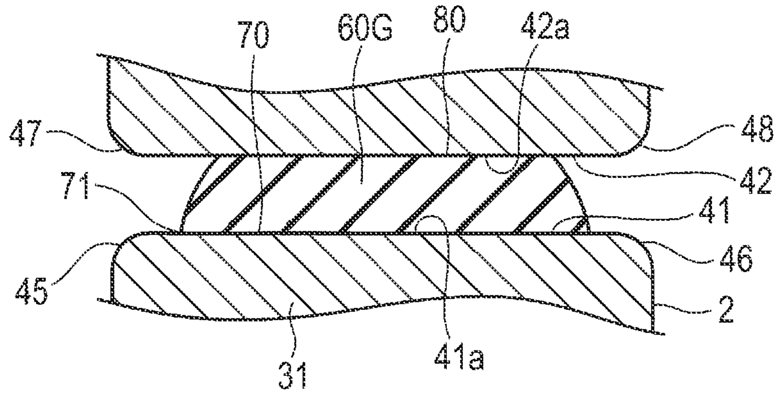
FIG. 6G is a cross-sectional view respectively showing the elastic coat shown in FIG. 5G in a compressed state.
Figure 7G:
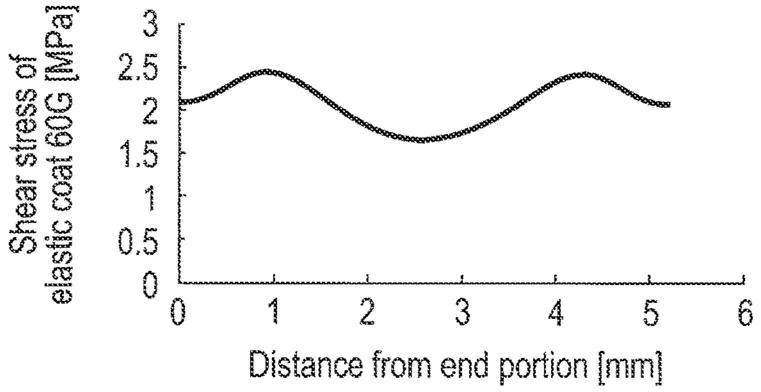
FIG. 7G is a view showing shear stress acting on an interface of the elastic coat when the elastic coat shown in FIG. 5G is in a compressed state.

FIG. 5G shows the elastic coat 60G of Example 7. The cross-section of the elastic coat 60G was convex upward and included a flat surface 80 in the center. A height H7 of the flat surface 80 was 1.5 mm. As shown in FIG. 6G, when the elastic coat 60G was compressed, the maximum value of the shear stress at the interface 70 was 2.49 MPa and the maximum value of the compressive stress was 8.68 MPa. FIG. 7G shows the relationship between the distance from the end 71 of the elastic coat 60G and the shear stress.

Example 8

Figure 5H:
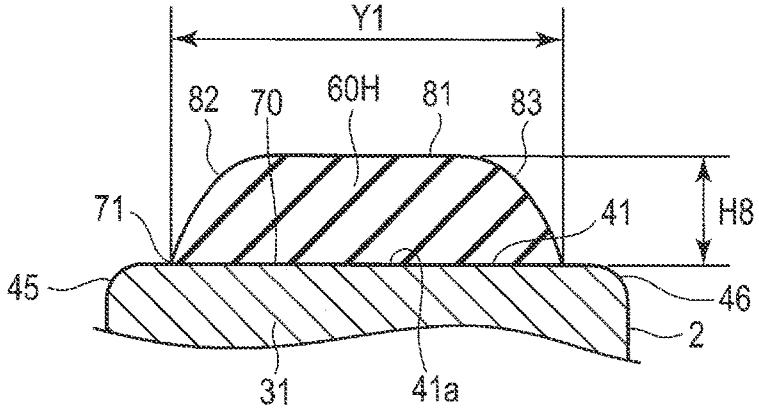
FIG. 5H is a cross-sectional view showing a part of an elastic coat and a rectangular cross-sectional portion of an Example 8.
Figure 6H:
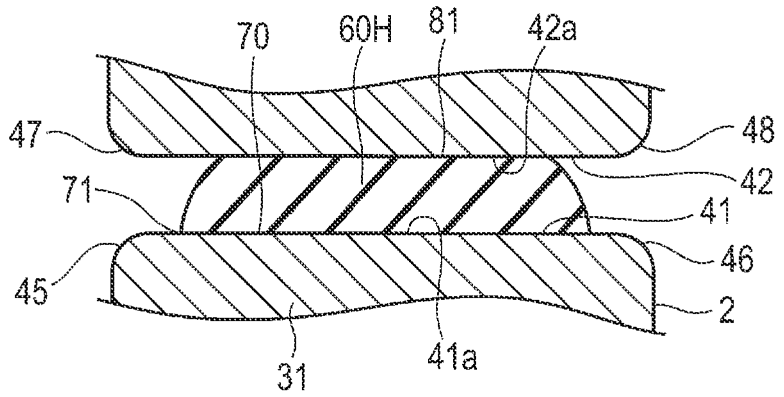
FIG. 6H is a cross-sectional view respectively showing the elastic coat shown in FIG. 5H in a compressed state.
Figure 7H:
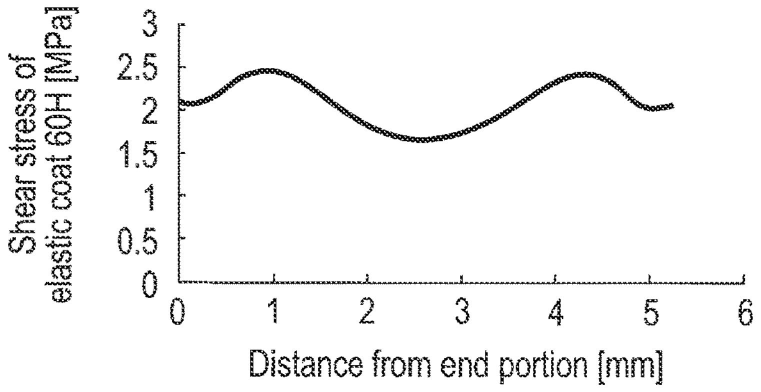
FIG. 7H is a view showing shear stress acting on an interface of the elastic coat when the elastic coat shown in FIG. 5H is in a compressed state.

FIG. 5H shows the elastic coat 60H of Example 8. The cross-section of the elastic coat 60H was concave upward and included a flat surface 81. A height H8 of the flat surface 81 was 1.5 mm. On respective sides of the flat surface 81, curved surfaces 82 and 83 were formed. As shown in FIG. 6H, when the elastic coat 60H was compressed, the maximum value of the shear stress at the interface 70 was 2.51 MPa and the maximum value of the compressive stress was 8.82 MPa. FIG. 7H shows the relationship between the distance from the end 71 of the elastic coat 60H and the shear stress.

Example 9

Figure 5I:
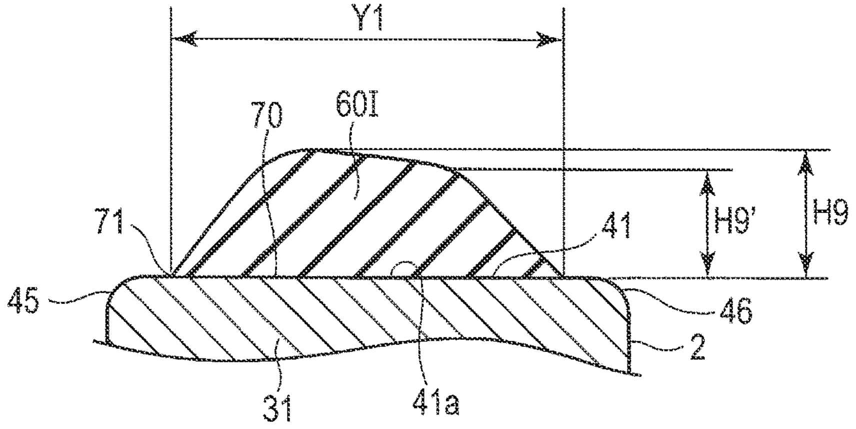
FIG. 5I is a cross-sectional view showing a part of an elastic coat and a rectangular cross-sectional portion of an Example 9.
Figure 6I:
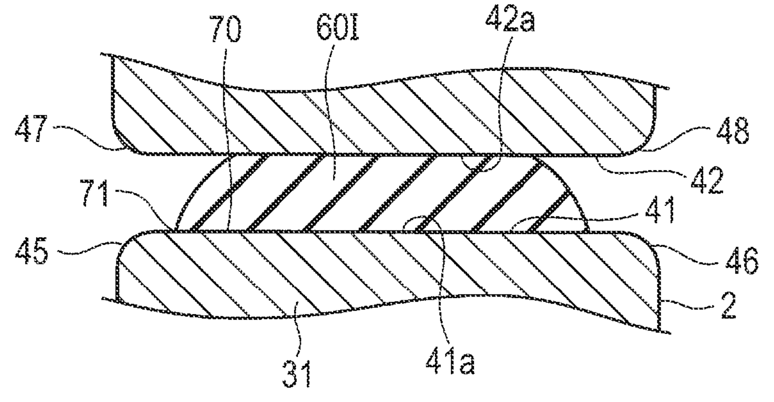
FIG. 6I is a cross-sectional view respectively showing the elastic coat shown in FIG. 5I in a compressed state.
Figure 7I:
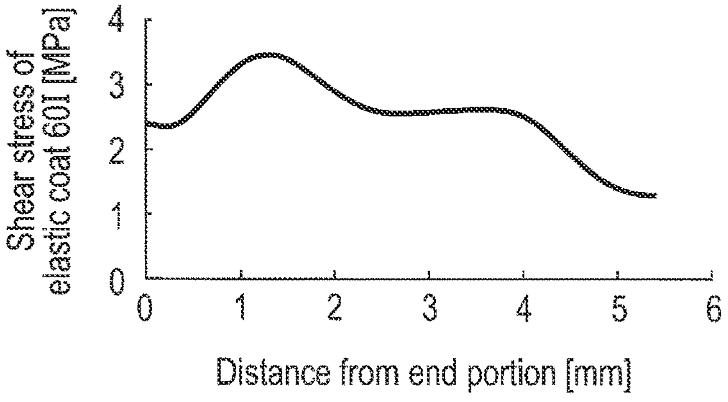
FIG. 7I is a view showing shear stress acting on an interface of the elastic coat when the elastic coat shown in FIG. 5I is in a compressed state.

FIG. 5I shows the elastic coat 60I of Example 9. The cross-section of the elastic coat 60I had a first height H9 and a second height H9'. The first height H9 and the second height H9' were 2.0 and 1.5 mm, respectively. As shown in FIG. 6I, when the elastic coat 60I was compressed, the maximum value of the shear stress at the interface 70 was 3.46 MPa and the maximum value of the compressive stress was 15.35 MPa. FIG. 7I shows the relationship between the distance from the end 71 of the elastic coat 60I and the shear stress.

Example 10

Figure 5J:
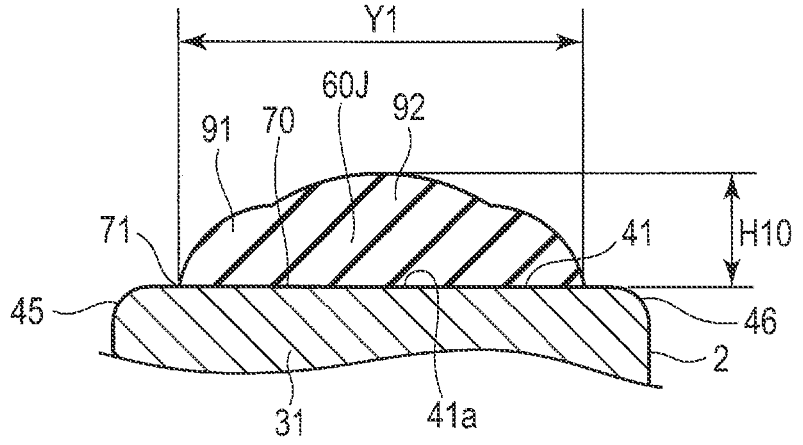
FIG. 5J is a cross-sectional view showing a part of an elastic coat and a rectangular cross-sectional portion of an Example 10.
Figure 6J:
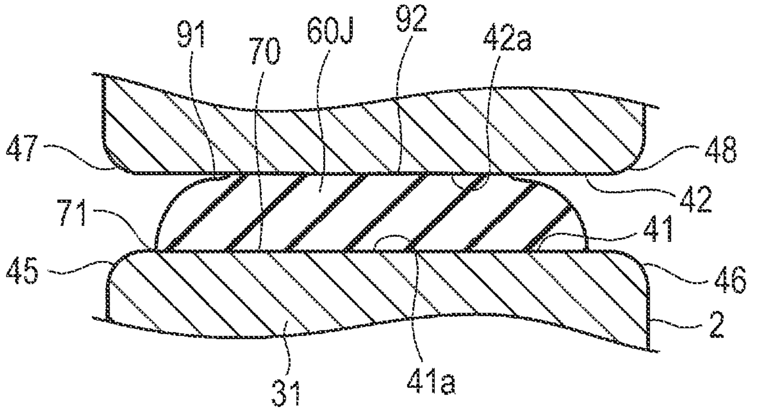
FIG. 6J is a cross-sectional view respectively showing the elastic coat shown in FIG. 5J in a compressed state.

FIG. 5J shows the elastic coat 60J of Example 10. The cross-section of the elastic coat 60J included a low convex portion 91 and a high convex portion 92. A height H10 of the high convex portion 92 was 1.5 mm. As shown in FIG. 6J, when the elastic coat 60J was compressed, the maximum value of the shear stress at the interface 70 was 3.34 MPa and the maximum value of the compressive stress was 13.87 MPa. FIG. 7J shows the relationship between the distance from the end 71 of the elastic coat 60J and the shear stress.

Example 11

Figure 5K:
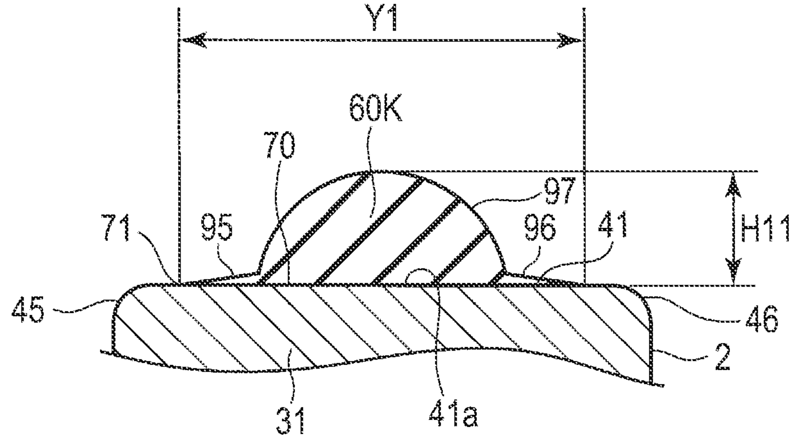
FIG. 5K is a cross-sectional view showing a part of an elastic coat and a rectangular cross-sectional portion of an Example 11.
Figure 6K:
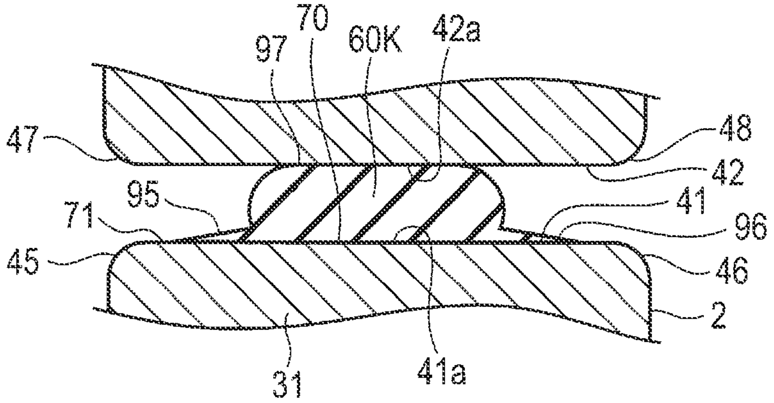
FIG. 6K is a cross-sectional view respectively showing the elastic coat shown in FIG. 5K in a compressed state.

FIG. 5K shows the elastic coat 60K of Example 11. The cross-section of the elastic coat 60K included thin base portions 95 and 96 formed at respective ends and a substantially semicircular convex portion 97 formed in the center. A height H11 of the convex portion 97 was 1.5 mm. As shown in FIG. 6K, when the elastic coat 60K was compressed, the maximum value of the shear stress at the interface 70 was 4.65 MPa and the maximum value of the compressive stress was 17.37 MPa. FIG. 7K shows the relationship between the distance from the edge 71 of the elastic coat 60K and the shear stress.

Evaluation of Examples 1 to 11

The elastic coats 60A to 60K of Examples 1 to 11 described above were each provided on the first plane 41*a* of the rectangular cross-sectional portion 31 of the coil spring 1. The elastic coats 60A to 60K were each formed to be continuous from the longitudinal middle (the round cross-sectional portion 30) of the effective spring part 13 of the coil spring 1 over the cross section varying portion 32 and the rectangular cross-sectional portion 31 along the length direction of the wire rod 2. The coil springs comprising the elastic coats 60A to 60K having such structures described above can suppress drawbacks such as banging noise and wear that occur when the coil portions 31*a*, 31*b* and 31*c* are brought into direct contact with each other.

When assuming that the coil springs are used in a suspension device of a vehicle, it is preferable that the shear stress at the interface 70 be 6.0 MPa or less. More preferably, the maximum value for the shear stress should be 3.5 MPa or less. In each of the elastic coat 60F shown in FIGS. 5F, 6F and 7F and the elastic coat 60K shown in FIGS. 5K, 6K and 7K, the shear stress at the interface 70 exceeded 3.5 MPa. However, even these elastic coats 60F and 60K may be used without problems depending on the use of the coil spring. With regard to compressive stress, the elastic coats 60A to 60E and 60G to 60K exhibited desirable values (20 MPa) or less. The compressive stress of the elastic coat 60F in Example 6 slightly exceeded 20 MPa, but it can be used in some applications.

Example 12

FIG. 8A is a perspective view showing a part of a coil spring 1 according to Example 12. FIG. 8B is a perspective view showing a part of a wire rod 2 of the coil spring 1 shown in FIG. 8A. The coil spring 1 shown in FIG. 8A includes a flat taper portion 110 formed at an end portion of the wire rod 2, and an elastic coat 60 provided on the wire rod 2. The flat taper portion 110 includes a first plane surface 111 and a second plane surface 112 approximately parallel to each other.

The cross-section of the flat taper portion 110 has such a shape that the distance (thickness) between the first plane surface 111 and the second plane surface 112 decreases from the round cross-sectional portion 30 to an end 2*b* of the wire rod 2. The width E1 of the distal end of the taper portion 110 (the end 2*b* of the wire rod 2) is the same as the diameter D1 of the round cross-sectional portion 30 or smaller than the diameter D1 of the round cross-sectional portion 30.

The elastic coat 60 is provided on at least one of the first plane surface 111 and the second plane surface 112. The elastic coat 60 is continuously provided from the round cross-sectional portion 30 over to the taper portion 110 or provided in a plurality of sections spaced apart from each other at intervals. The cross-sectional shape and material of the elastic coat 60 are the same as those of one of the elastic coats 60A to 60K of Examples 1 to 11, respectively. Between the first side portion 61 of the elastic coat 60 and the outer surface of the wire rod 2, the above-described rubber protective portion 65 may be defined.

Example 13

FIG. 9A is a perspective view showing a part of a coil spring 1 according to Example 13. FIG. 9B is a perspective view showing a part of a wire rod 2 of the coil spring 1 shown in FIG. 9A. The coil spring 1 shown in FIG. 9A includes a round taper portion 120 formed at an end of the wire rod 2 and an elastic coat 60 provided on the wire rod 2.

The cross-section of the round taper portion 120 (the cross-section perpendicular to the axis X2 of the wire rod 2) has such a shape that the diameter thereof decreases from the round cross-sectional portion 30 to the end of the wire rod 2. The diameter dl of the end 2*b* of the wire rod 2 is smaller than the diameter D1 of the round cross-sectional portion 30. The elastic coat 60 is continuously provided from the round cross-sectional portion 30 to the end 2*b* of the wire rod 2 or provided in a plurality of sections spaced apart from each other at intervals. The cross-sectional shape and material of the elastic coat 60 are the same as those of one of the elastic coats 60A to 60K of Examples 1 to 11, respectively.

Another Embodiment

Figure 10:
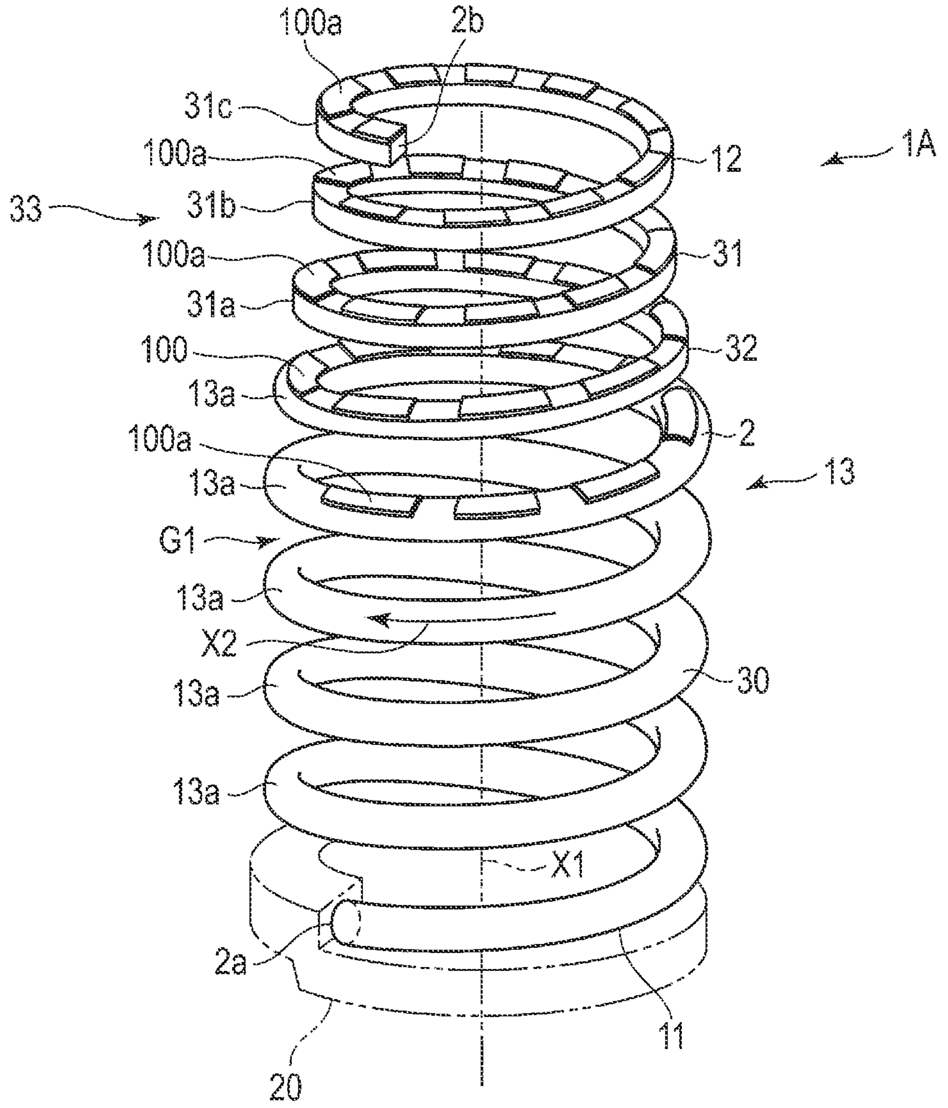
FIG. 10 is a perspective view showing a coil spring according to another embodiment.

FIG. 10 shows a coil spring 1A according to another embodiment. An elastic coat 100 of the coil spring 1A of this embodiment comprises a plurality of elastic coat elements 100*a* disposed to be spaced apart from each other along the length direction of a wire rod 2. The material and cross-sectional shape of the elastic coat elements 100*a* are common to the elastic coat 60 of the first embodiment. The length and thickness of the elastic coat elements 100*a*, as well as the locations of the elements 100*a* are set as necessary. The other configurations are common to those the coil spring 1 of the first embodiment (FIG. 1), and therefore these common parts are denoted by common reference symbols and the descriptions thereof will be omitted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coil spring including a wire rod with one end and another end and including a coil section comprising a plurality of coil portions, the coil spring comprising:

a rectangular cross-sectional portion whose cross-section perpendicular to a longitudinal direction of the wire rod is rectangular, the rectangular cross-sectional portion including a first plane, a second plane, an outside plane extending along a central axis of the coil spring, and an inside plane extending along the central axis, and the first plane and the second plane opposing each other in the coil section;

an elastic coat provided on the first plane of the rectangular cross-sectional portion, the elastic coat comprising a flat adherent surface adhered to the first plane and a non-adherent surface facing the second plane, and the non-adherent surface contacting the second plane in a state in which the coil section is compressed; and a flat interface defined between the flat adherent surface of the elastic coat and the first plane, the flat interface being provided between respective ends of the elastic coat along a width direction of the elastic coat, wherein:

one of the ends of the wire rod includes a flat taper portion including a first plane surface and a second plane surface, a distance between the first plane surface and the second plane surface decreases toward the one of the ends of the wire rod, the elastic coat is provided on at least one of the first plane surface and the second plane surface, the wire rod comprises:

a round cross-sectional portion whose cross-section perpendicular to the longitudinal direction of the wire rod is round; and a cross section varying portion formed between the round cross-sectional portion and the rectangular cross-sectional portion, and the elastic coat is provided continuously from the round cross-sectional portion over the cross section varying portion and the rectangular cross-sectional portion along the longitudinal direction of the wire rod.

2. The coil spring of claim 1, wherein:

the elastic coat comprises:

a first coat portion provided on the round cross-sectional portion;

a second coat portion provided on the cross section varying portion; and a third coat portion provided on the rectangular cross-sectional portion, and the first coat portion, the second coat portion, and the third coat portion are continuous along the longitudinal direction of the wire rod.

3. The coil spring of claim 1, further comprising:

a first end turn part including the one end of the wire rod;

a second end turn part including the another end of the wire rod; and an effective spring part between the first end turn part and the second end turn part, wherein:

one of the first end turn part and the second end turn part includes the rectangular cross-sectional portion on which the elastic coat is provided.

4. The coil spring of claim 1, wherein:

the cross section varying portion comprises a first plane portion continuous to the first plane of the rectangular cross-sectional portion, and the elastic coat is provided continuously over the first plane and the first plane portion.

5. The coil spring of claim 1, wherein:

the rectangular cross-sectional portion includes the first plane and arc-shaped corner portions formed on respective sides of the first plane, and a width of the elastic coat is less than or equal to a width of the first plane.

6. The coil spring of claim 1, wherein:

the elastic coat is made of a cured material of a resin having urethane bonds, and tear strengths of the elastic coat at 25° C. and 80° C. are 20 kN/W or more but 350 KN/m or less.

7. The coil spring of claim 1, wherein a shear stress of the elastic coat at the flat interface is 6.0 MPa or less at 25° C.

8. The coil spring of claim 1, wherein the elastic coat is provided on a part of the plurality of coil portions.

9. The coil spring of claim 8, wherein the elastic coat is provided only on those coil portions of the plurality of coil portions that may come into contact with each other when the coil spring is compressed.

10. The coil spring of claim 1, wherein:

the elastic coat includes a first side portion facing an outside of the coil spring and a second side portion facing an inside of the coil spring, the first side portion of the elastic coat is located on an inner side of the coil spring with respect to an outermost surface of the wire rod, and the wire rod includes a rubber protective portion constituted by a part of the wire rod, the rubber protective portion being between the first side portion and the outermost surface of the wire rod.

11. The coil spring of claim 10, further comprising:

a corner portion having a cross-section of an arc shape along the central axis of the coil spring, the corner portion being between the first plane of the rectangular cross-sectional portion and the outermost surface, wherein the rubber protective portion comprises the corner portion.

12. The coil spring of claim 1, wherein the elastic coat comprises a plurality of elastic coat elements arranged spaced apart from each other along the longitudinal direction of the wire rod.

* * * * *